(12) United States Patent
Aydin et al.

(10) Patent No.: US 11,692,069 B2
(45) Date of Patent: Jul. 4, 2023

(54) METHOD FOR MAKING FLUOROCARBON FREE EMULSIONS WITHOUT USING TRADITIONAL SURFACTANTS/EMULSIFIERS BY EMULSIFYING ALKOXYSILANES OR OTHER NON-WATER SOLUBLE HYDROPHOBIZING AGENTS USING AMINO FUNCTIONAL SILOXANES AND THE USES THEREOF

(71) Applicant: ORGANOCLICK AB, Täby (SE)

(72) Inventors: Juhanes Aydin, Södertälje (SE); Salman Hassanzadeh, Vallentuna (SE)

(73) Assignee: ORGANOCLICK AB, Täby (SE)

( * ) Notice: Subject to any disclaimer, the term of this patent is extended or adjusted under 35 U.S.C. 154(b) by 1155 days.

(21) Appl. No.: 16/293,679

(22) Filed: Mar. 6, 2019

(65) Prior Publication Data
US 2019/0218348 A1 Jul. 18, 2019

Related U.S. Application Data

(63) Continuation of application No. PCT/SE2017/050882, filed on Sep. 6, 2017.

(30) Foreign Application Priority Data

Sep. 6, 2016 (SE) .................... 1651195-8

(51) Int. Cl.
| | |
|---|---|
| *D06M 15/643* | (2006.01) |
| *C08J 3/03* | (2006.01) |
| *D06M 13/513* | (2006.01) |
| *C08K 5/5419* | (2006.01) |
| *D06M 23/10* | (2006.01) |
| *D06M 101/32* | (2006.01) |

(52) U.S. Cl.
CPC .............. *C08J 3/03* (2013.01); *C08K 5/5419* (2013.01); *D06M 13/513* (2013.01); *D06M 15/6436* (2013.01); *D06M 23/10* (2013.01); *C08J 2383/08* (2013.01); *D06M 2101/32* (2013.01); *D06M 2200/01* (2013.01); *D06M 2200/12* (2013.01)

(58) Field of Classification Search
CPC ....... C08G 77/26; C07F 7/18; D06M 2200/12
See application file for complete search history.

(56) References Cited

U.S. PATENT DOCUMENTS

| | | | | |
|---|---|---|---|---|
| 3,852,075 | A | | 12/1974 | Dasadur |
| 4,436,856 | A | * | 3/1984 | Huhn ................ D06M 15/6436 524/588 |
| 4,631,207 | A | * | 12/1986 | Price ........................ C08K 5/06 524/588 |
| 6,323,268 | B1 | | 11/2001 | Fisher et al. |
| 6,403,163 | B1 | * | 6/2002 | Fisher ................. C04B 40/0039 524/588 |

FOREIGN PATENT DOCUMENTS

| | | |
|---|---|---|
| DE | 102006032456 A1 | 2/2007 |
| DE | 102011110100 A1 | 2/2013 |
| EP | 0415254 A2 | 3/1991 |
| EP | 0780421 A2 | 12/1995 |
| GB | 1458319 A | 12/1976 |
| JP | H05156164 A | 6/1993 |
| WO | 9910440 A1 | 3/1999 |
| WO | 0200570 A1 | 1/2002 |
| WO | 014139931 A2 | 9/2014 |
| WO | 201419931 A2 | 9/2014 |

* cited by examiner

*Primary Examiner* — Kuo Liang Peng
(74) *Attorney, Agent, or Firm* — Renner, Otto, Boisselle & Sklar, LLP

(57) ABSTRACT

The present invention relates to an improved emulsified composition comprising
a) —one or more amino functional siloxanes of the formula I
b) —one or more hydrolysable alkyl silans of the formula II
c) an acid
d) water
e) a defoamer
f) a coalescent agent and optionally
  one or more of a preservative, co-emulsifier, catalyst, rheology modifier, fatty acid, oil and/or wax,
the process of preparing it and the application method of enhancing the water repellence of an inorganic, organic or fiber based materials and/or enhancing the said materials ability to repel water soluble dirt, as well as an apparatus for use in said method.

21 Claims, No Drawings

METHOD FOR MAKING FLUOROCARBON FREE EMULSIONS WITHOUT USING TRADITIONAL SURFACTANTS/EMULSIFIERS BY EMULSIFYING ALKOXYSILANES OR OTHER NON-WATER SOLUBLE HYDROPHOBIZING AGENTS USING AMINO FUNCTIONAL SILOXANES AND THE USES THEREOF

This application is the continuation of International Application No. PCT//SE2017/050882, filed 6 Sep., 2017, which claims the benefit of Swedish Patent Application No. SE 1651195-8, filed 6 Sep., 2016, the entire contents of which are hereby incorporated by reference.

Field of Invention

The present invention relates to a water-based chemical composition and an improved method for obtaining enhanced water-repellence of inorganic, organic or fiber based materials, with good washing and/or weathering-durability.

Background of the Invention

Hydrolysable alkylsilane and their corresponding polycondensates are well known, as well as their use as hydrophobizing agents. Hydrolysable alkylsilane are usually not used in concentrated form, since they are extremely expensive products. Furthermore, hydrolysable alkylsilane are not soluble in water. In order to prepare sufficiently stable solutions or formulations of hydrolysable alkylsilane and corresponding cocondensates, organic solvents or emulsifiers have been employed as described in, for example DE 34 47 636, DE 36 13 384, WO 95/23830, WO 95/23804, WO 96/06895, WO 97/23432 and EP 0 846 716 (prior art documents). A disadvantage of solvent containing formulations is the fact that such systems are undesirable on ecological and work safety grounds. Another disadvantage of emulsifier-containing formulations is the fact that such systems, emulsions contain surface active agents, tend to be counterproductive to the water repellent effect, in terms of rewetting of the treated material. This means that the material needs an extra rinsing step to wash away residual surface active agents for the water repellent effect to exhibit full effect. Efforts have, therefore, increasingly been made to provide water-based systems with the lowest possible content of emulsifiers and volatile organic compounds (abbreviation: "VOC"). Nitrogen-containing amino functional organosiloxanes are known as water-soluble constituents in otherwise emulsifier- and surfactant-free compositions for rendering surfaces Water-, oil- and dirt-repellent as described in DE 15 18 551, EP 0 738 771 and EP 0 846 717). A relatively high content of aminoalkyl groups must always be used in the water-based systems mentioned in order to ensure a good solubility in water. On the other hand, a high content of aminoalkyl groups is counterproductive, since these groups have hydrophilic properties and, therefore, counteract the efforts to provide a system which, as far as possible, exhibits hydrophobic properties. Additionally, the use of fluorocarbon containing compounds is under strong debate among governments and in industry due to the bioaccumulation and persistency of such chemical structures along with negative effect on human health, animals and environment. A need continues to exist for water-dispersable amino functional organosiloxanes, but which retain hydrophobic properties and are durable to laundry and/or weathering and at the same time can provide, in acidic conditions, a strong enough surface activity in order to stabilize an oil phase such as hydrolysable alkylsilane and/or non-water soluble hydrophobizing agent in water and enough reactivity to provide fluorocarbon free durable water repellent effect.

Durable water repellent finishes are hydrophobic coatings that are applied to materials, for example textiles, to make them water-repellent. However, despite the name, most durable water repellent finishes on the market tend to wear off with time and show very poor durability in harsh conditions (e.g. a textile washing process or in an acidic environment). Several inventions have been developed in order to obtain textiles with water repellent properties. The known methods give however textiles with poor wear resistance and washing durability and are somewhat difficult to apply onto the material. Other known methods give textiles a stiff hand and/or yellowing. Furthermore, some methods require a rinsing step for the water repellent effect to show itself, since after treating textiles some residual surface active components are left and cause backwetting. The reason for the unacceptable wash resistance of the mentioned systems is the weak attachment of the hydrophobizing agent to the textile fibers. The reason for the unacceptable backwetting effect, and the requirement for an additional rinsing step, is due to the use of excess, or not suitable surface active reagents causing backwetting.

Hence, to achieve persistent water-repellency, it is imperative for the water-repellent coating to penetrate deep into the material, to have a large outer surface area coverage, and form strong covalent bonds to and/or around the fibers, with the additional requirement of them withstanding the harsh conditions in e.g. house-hold washing machines or out-doors. While obvious, it is not a straight forward matter to produce these bonds, as very few, if any, hydrophobizing compositions (for treatment of e.g. cellulosic fabrics) fulfill the combined requirements of formation of covalent bonds that withstand high alkaline conditions (pH>10) at high temperatures (≤40 C°), industrial relevant application times of the formulation, acceptable market competitive cost and a non-hazardous application process; not to mention non or little impact on the environment.

For decades, the application of fluorine compounds has been the route of choice in the manufacturing of e.g. water-repellent clothing. The success of fluorocarbons is due to their extreme hydrophobicity and oleophobicity, their extremely low surface tension and their tendency to remain on the textile. But despite its proven effectiveness, the application of "fluorocarbons" is highly controversial, due to its negative impact on the environment and to studies on animals showing that accumulated fluorocarbons (in the body) can be extremely hazardous.

The potential of (non-fluorinated) hydrolysable organosilanes, which are derivatives of silanes containing at least one carbon to silicon bond, to render water repellency to surfaces has been known for some time. Particularly, the so called alkoxysilanes and silicon halides (which have at least one hydrophobic moiety and one to three hydrolysable alkoxy and halide groups respectively) have long been regarded as potential candidates for rendering water-repellency to hydroxyl bearing surfaces (e.g. cellulose containing materials). This view is based on the knowledge that in the presence of water the reactive groups (alkoxy/halides) of organosilanes hydrolyze to form hydroxyl (OH) groups. These groups (in theory) promote the adsorption of the silanes to the OH-bearing surface through a hydrogen bonding mechanism. The silanes can subsequently be covalently attached to the surface through a heating process leading to the release of water.

However, the hydrolyzed monomeric organosilanes are highly reactive and are known to undergo condensation reactions (in the solution), leading to the formation of polymeric structures (and gels during prolonged times). Also, the high reactivity of the mentioned silanes (specially the silicon halides) requires the undertaking of highly complex measures (to ensure "dry" water-free conditions) to maintain the silanes in their reactive form, something that up to date has been considered as too complicated and not economical.

Accordingly, there are very few patents or other publications available that deal with the hydrophobization of textile with (non-fluorinated) organosilanes. Even fewer patents put emphasis on the resulting washability/durability. From the above it is clear that non-fluorinated durable water repellent finishes have to be/remain firmly attached to the substrate, especially under "normal" washing conditions, before they can be regarded as possible alternatives for the "fluorine equivalents". It is further clear that employing hydrolysable organosilanes is not an easy task due to their high reactivity, which to the best knowledge of the inventors up to date has made their application impractical. What is also unattractive from an economic, environmental and practical point of view is the use of organic solvents, such as alcohols, in the application of organosilanes or fluorocarbons. Further, the application of hydrolysable organosilanes must be affordable, industrially feasible, and be more environmentally friendly than the existing "fluorine coating" processes. Additionally, hazardous solvents should be avoided and instead the use of water promoted. The general objective in preparing a water based composition for rendering materials water repellent, is to devise a system in which the reactivity of the hydrolysable organosilane is maintained over a long period of time, making use and storage of said composition practically, economically and environmentally feasible. It is also important that the process is more environmentally friendly than the current silane processes, which comprises use of different solvents. There is also a need for a durable coating which stays on the fabric after washing and that does not cause unwanted yellowing or a stiff hand. There is also a need for a durable coating that has a broad curing temperature so that it can be used on a large variety of materials (ranging from very temperature sensitive to less temperature sensitive) using a large variety of instruments/machines (covering for example industrial curing ovens to consumer tumble dryers and similar). Additionally, there is a need for a durable coating that does not cause backwetting on the treated material and that requires a rinsing step before reaching an acceptable water repellency. Currently there is no hydrophobization process which fulfills all (or at least the majority) of the stated requirements. This has been the motivation for the work leading to this invention. In what follows, a novel amino functional organosiloxane-hydrolysable alkylsilane composition containing coalescent agent, defoamer water together with its application process, which is believed to fulfill the stated requirements, will be presented.

The emulsion according to the present application has non rewetting characteristics, is stable over long periods of time both as a concentrated but also as dilution, can be altered to fit many kinds of applications through operationally simple inclusions of optional additives such as catalysts, fatty acids, fatty oils, waxes, rheology modifiers, preservatives and the like.

PRIOR ART

In addition to the documents mentioned in the background of the invention further prior art are analyzed in the following:

In the patent application PCT/EP2011/050066 the inventor describes a method in which organosilanes are utilized for making cellulosic fibers hydrophobic. In this process alcohols or organic solvents can be used. Also a strong acid of $pK_a < 1.1$ is employed as catalyst which has to be removed after the material has been treated in order for the water repellency to be good. The use of organic solvents and alcohols along with the use of very strong acids are impractical from an industrial point of view both in terms of corrosion, health aspects, flammability, and explosion risk and also in terms of the negative effect on the esthetical and mechanical properties of the treated material caused by the strong acid. Additionally, the acid must be rinsed away in order for the water repellent effect to take place, which is not always practical depending on the material that has been treated.

In WO2014/139931 an emulsion is being used with water as solvent. According to that method curing takes place at a relatively low temperature, but rewetting is occurring, and an extra rinsing step is required, which is avoided with the emulsion according to the present invention containing amino functional siloxanes with a controlled level of nitrogen. WO/0200570 discloses aqueous water-repellant compositions for mineral substrates based on a methylhydrogensiloxane polymer a copolymer and a silicone resin. An emulsion of an aminopolysiloxane can be added. However, D2 does not mention, or in any way guide a skilled person to, aminosiloxanes with a particularly, defined low of nitrogen that acts as an emulsifier at a low pH.

WO9910440 discloses water-repellant compositions for adapted for masonry different including aminosiloxanes, alkylalkoxysilanes and amino functional silanes, but does give any solution to the problem of excess amount surfactants in water-repellant compositions.

In patent application US2009206296 the silane compositions described comprise a solvent which is used in order dissolve the composition components. As stated earlier, the use of organic solvents or alcohols is impractical due to flammability, toxicity etc. from an industrial- and health point of view. Additionally, low spray test results along with the lack of washability limit their usefulness in the production of durable water repellent textiles or other materials.

Other documents showing examples of silane compositions and uses are; GB1199501, GB1458319, GB2431929, EP0646618 and U.S. Pat. No. 6,106,607, which all describe the use of one or more ingredients of the emulsion according to the present invention for making water repellent emulsions.

SUMMARY OF THE INVENTION

The present invention relates to an emulsified composition which is equally consumer application friendly for the application on inorganic, organic or fiber based materials yielding an immediate durable and highly water repellent treated material as well as a method of treating inorganic, organic or fiber based materials with said water-based chemical composition and a method for its preparation.

Industrially the emulsified composition of the invention is applied to the inorganic, organic or fiber based materials yielding an immediate durable and highly water repellent treated material.

The water-based chemical composition of the present invention relates to the use of an organosiloxane functionalized with nitrogen as a temporary emulsifier in the presence of an acid. More particularly, the present invention relates to a composition which comprises an amino functional organosiloxane, hydrolysable alkylsilane, water, acid, defoamer, coalescent agent, and optionally a co-emulsifier and/or catalyst and/or preservative and/or rheology modifier and/or fatty acid and/or fatty oil and/or wax. The present amino functional organosiloxanes are used in the formulation of very stable aqueous compositions over time. This invention offers an alternative method to the use of fluorine and surfactant based compounds for rendering inorganic, organic or fiber based materials an immediate and extreme water repellent property with good washing and/or weathering durability. This invention also offers tunable drying and curing times and temperatures ranging between for example between 10-90° C. (consumer friendly product) or 90-190° C. (industry friendly product) facilitating product diversification according to end user requirements and drying and curing times as low as seconds to minutes to hours. The inventive composition is the result of careful selection of an amino functional organosiloxane (temporary surfactant in the presence of an acid), acid (catalyst and activator of the surface active properties of the amino functional organosiloxane), hydrolysable alkylsilane (hydrophobizing agent), defoamer, coalescent agent and water as solvent and by optionally adding one or more of the following: co-emulsifier and/or catalyst and/or preservative and/or rheology modifier and/or fatty acid and/or fatty oil and/or wax.

Preparation

The present invention relates to the preparation and use of amino functional organosiloxanes in the presence of an acid, as replacement for traditional organic surfactants/emulsifiers and enables formation of stable emulsions where the oil phase further comprises hydrolysable alkyl silane and optionally fatty acid and/or fatty oil and/or wax, and the continuous phase is water which comprises coalescent agent, defoamer and optionally co-emulsifier and/or catalyst and/or preservative and/or rheology modifier. Benefits are much less back wetting/rewetting of the surface after the emulsion has been applied, dried and cured at ambient temperature or at elevated temperature which results in an immediate extreme water repellency which is durable to repeated washings and weathering. The protonated amino functional organosiloxane acts as a surfactant/emulsifier in the presence of acid where it is protonated and hence becomes temporarily cationic. The amino functional organosiloxane becomes a part of the coating after curing by aligning the polar nitrogen atoms towards the fiber surface while pointing the dimethylsiloxane hydrophobic part outwards yielding a hydrophobic surface together with the hydrolysable alkylsilane. The smaller molecules of hydrolysable alkylsilane in the oil phase, permits deep penetration into the material while the larger structure of amino functional siloxane permits docking to the outer part of the material surface, these two mechanisms together result in a very good coverage of the treated material which exhibits durable water repellence property.

Since the nitrogen content, which is partly responsible for the surface activity in the emulsion of the invention, is kept as low as possible, it may be balanced with a minimum amount of co-emulsifier and/or coalescent agent in order to facilitate the formation of an emulsion and maintain a non-rewetting effect on the treated material which, after drying and curing, is clearly shown by the immediate water repellence property. Balancing these two components will enable the use of conventional stirrers, homogenizers and high pressure homogenizers in the preparation of the final emulsion.

The objects of the invention are also attained by a method of preparing the above disclosed embodiments of compositions. For the production of an emulsified composition of the invention, the method comprises the steps of mixing amino functional organosiloxane, hydrolysable alkylsilane, water, acid, defoamer, coalescent agent, and optionally a co-emulsifier and/or catalyst and/or preservative and/or rheology modifier and/or fatty acid and/or fatty oil and/or wax. The method of producing an emulsified composition may comprise one or more homogenization steps.

In a preferred embodiment, the method comprises the steps of:
a) Adding the amino functional organosiloxane, hydrolysable alkylsilane and defoamer to water,
b) Adding acid, coalescent agent to the resulting mixture in step a,
wherein the resulting mixtures in steps a-b are optionally mixed and/or optionally homogenized.

In a preferred embodiment, the method comprises the steps of:
a) Adding the amino functional organosiloxane, hydrolysable alkylsilane, coalescent agent and defoamer to water,
b) Adding acid to the resulting mixture in step a,
wherein the resulting mixtures in steps a-b are optionally mixed and/or optionally homogenized.

In a preferred embodiment, the method comprises the steps of:
a) Adding the amino functional organosiloxane, hydrolysable alkyl silane, acid and defoamer to water,
b) Adding coalescent agent to the resulting mixture in step a,
wherein the resulting mixtures in steps a-b are optionally mixed and/or optionally homogenized.

In all the above described methods optionally co-emulsifier and/or catalyst and/or preservative and/or rheology modifier and/or fatty acid and/or fatty oil and/or wax can be added to step a and/or b. Further, water soluble optional additives can be added to the already finished product prior use.

The objects of the invention are also attained by using the above disclosed embodiments of emulsified composition as a water repellent agent for inorganic, organic or fiber based materials.

The objects of the invention are also attained by inorganic, organic or fiber based materials comprising the above disclosed embodiments of the emulsified composition of the invention as a water repellent agent.

Apparatus

The objects of the invention are also attained by an apparatus comprising the above disclosed embodiments of the emulsified composition of the invention as a water repellent agent. The apparatus is any kind of laboratory or industrial equipment using low and/or high shear forces for producing the emulsified composition of the invention. This might be a magnet stirrer, overhead stirrer with propeller or disperser or like, homogenizer with or without high pressure, in-line or external homogenizers, extruders, shaking equipment, mortar and pestle, blender type of instrument, any kind of mixer (static mixer, micro mixer, vortex mixer, industrial mixer, ribbon blender, V blender, continuous processor, cone screw blender, screw blender, double cone blender, double planetary, high viscosity mixer, counter-rotation, double and triple shaft, vacuum mixer, high shear rotor stator, dispersion mixer, paddle, jet mixer, mobile mixer, drum mixer, intermix mixer, planetary mixer, Banbury mixer or like), French press, disintegrator, mill (grinding by bead mill, colloid mill, hammer mill, ball mill, rod mill, autogenous mill, semiautogenous grindning, pebble mill, high pressure grinding rolls, buhrstone mill, vertical shaft impactor mill, tower mill or like), ultrasonic treatment, rotor-stator mechanical equipment, any kind of propeller or mixer, high temperature and/or high pressure bitumen emulsifiers or combinations of the above.

Application Method

The present invention relates to an application method of enhancing the water repellence of an inorganic, organic or fiber based materials, comprising the steps of:

a) Applying an emulsified liquid composition according to the invention on an inorganic, organic or fiber based materials, wherein said emulsified liquid composition comprising of: amino functional organosiloxane, hydrolysable alkylsilane, water, acid, defoamer, coalescent agent, and optionally a co-emulsifier and/or catalyst and/or preservative and/or rheology modifier and/or fatty acid and/or fatty oil and/or wax.

b) Optionally adjusting the amount of the composition applied on the inorganic, organic or fiber based materials c) Drying the treated inorganic, organic or fiber based materials until dry d) Optionally curing the treated inorganic, organic or fiber based materials at a temperature of between 0–250° C., more preferably for consumers 10-90° C., and industry 90-250° C., most preferred consumer temperature is 15-60° C. and industrial 90-19° C.

The composition may be applied in industrially relevant process times rendering highly durable and water-repellent textiles.

Accordingly, one object of the present invention is to provide a water based composition which has an immediate water repellent effect on said treated material.

Another object of the present invention is to provide a composition with very good shelf life stability.

A further object of the invention is to avoid or strongly minimize the use of surface active agents/emulsifiers/surfactants which negatively affect the final water repellent properties of the treated material and which might have adverse effect on the environment when washed/leached out.

A further object of the invention is to provide a fluorocarbon free composition with comparable water repellent properties.

A further object of the invention is to provide a composition which can be highly diluted with water (for example 1:30) with maintained bath stability A further object of the invention is to provide a composition which can be highly diluted with water (for example 1:8) and with maintain shelf live as the undiluted composition A further object of the invention is to provide a composition which after treating the material yields a material with a soft hand.

A further object of the invention is to provide a composition which after treating the material yields a material with very low yellowing or no yellowing.

A further object of the invention is to provide a composition with low viscosity <100 mPas.

A further object of the invention is to provide a composition within a pH range of 1-7, more preferably within 2.5-4.5.

A further object of the invention is to provide a composition which is easily manipulated to fit certain application by the addition of suitable optional additives. Cheap, slow curing and deep penetrating by excluding said optional catalyst, or increased reactivity, reduced yellowing, one component composition with said optional catalyst.

A further object of the invention is to provide a composition according to the invention by utilizing an amino functional organosiloxane which has a concentration of the amino functional organosiloxanes in the composition in the range of 0.01-20 w/w %, or between 0.05-15 w/w % or between 0.1-10 w/w % or between 0.2-8 w/w % for example 3 w/w % compared to the total amount of composition in order to provide excellent hydrophobicity and composition stability (during the material modification process).

A further object of the invention is to provide a composition according to the invention by utilizing an amino functional organosiloxane which has a controlled, low nitrogen content of less than 1.7% N, such as 0.01 to 1.6% N, 0.05 to 1.2% N, 0.05 to 0.5% N, or 0.1 to 0.4% N.

An application method according to the invention wherein said hydrolysable alkylsilane the hydrolysable groups are selected from hydroxy, acetoxy, methoxy, ethoxy, n-propoxy, isopropoxy, n-butoxy, isobutoxy or tert butoxy.

An application method according to the invention wherein said hydrolysable alkylsilane in said emulsified liquid composition is selected from the group having an alkyl chain with a number of carbon atoms higher than 3 but equal to or less than 30 carbons.

An application method according to the invention wherein the hydrolysable alkylsilane is preferably selected from n-, iso configured or mixtures thereof of octyltrimethoxy, octyltriethoxy, hexadecyltrimethoxysilane, hexadecyltriethoxy and/or octadecyltrimethoxy silanes.

An application method according to the invention wherein the alkyl group of said hydrolysable alkyl silane is a linear, branched or cyclic carbon chain or an unsaturated and saturated carbon chain.

An application method according to the invention wherein said acid in said emulsified liquid composition has a pKa of less than 7 or between 1.5-5, especially 1.9-4.9.

An application method according to the invention wherein the acid is a Lewis acid.

An application method according to the invention wherein the acid is an organic or inorganic acid.

An application method according to the invention wherein the acid is chosen from any of para-toluenesulfonic acid, benzenesulfonic acid, camphorsulfonic acid, stearic acid, malic acid, maleic acid, glyoxylic acid, citric acid, formic acid, pyruvic acid, tartaric acid, phtalic acid, acetylsalicylic acid, salicylic acid, lactic acid, dihydroxy fumaric acid, mandelic acid, malonic acid, glycolic acid, acetic acid, succinic acid, hydrochloric acid, sulfuric acid and oxalic acid.

An application method for rendering an inorganic, organic or fiber based material durable water repellent and/or water soluble dirt repellent according to the invention wherein drying the treated material is performed at a temperature of between 0–250° C. until dry, more preferably for consumers 10-90° C., and industry 90-250° C., most preferred consumer temperature is 15-60° C. and industrial 90-19° C.

An application method for rendering an inorganic, organic or fiber based material durable water repellent and/or water soluble dirt repellent according to the invention wherein curing the treated material is performed at a temperature of between 0–250° C. until cured, more preferably for consumers 10-90° C., and industry 90-250° C., most preferred consumer temperature is 15-60° C. and industrial 90-19° C.

Further this invention also relates to;

An emulsified liquid composition used in the application method according to the invention.

An inorganic, organic or fiber based material which is durable water repellent and water soluble dirt repellant treated using the application method according to the invention.

Use of the emulsified liquid composition according to the invention according to the application method according to the invention to make an inorganic, organic or fiber based material durable water repellent.

Use of an emulsified liquid composition according to the invention according to the application method according to the invention to make an inorganic, organic or fiber based material durable dirt repellant towards water soluble dirt, for example wine, ketchup, coffee or soil.

Throughout the specification the word composition has been used for identifying a formulation for use in a method of obtaining inorganic, organic or fiber based material, which are water repellant and/or water soluble dirt repellent surface.

OBJECTS OF THE INVENTION

It is an object of the invention to provide an environmentally friendly, fluorocarbon free, industrially applicable method for treating inorganic, organic or fiber based materials such as textiles in order to achieve a durable water-repellency and/or repellency for water soluble dirt. The present invention relates to an application method of enhancing the water repellence of inorganic, organic or fiber based materials, comprising the steps of:
a) Applying an emulsified liquid composition according to the invention on an inorganic, organic or fiber based materials, wherein said emulsified liquid composition comprising of: see examples
b) Optionally adjusting the amount of the composition applied on fiber based materials
c) Drying the treated fiber based materials until dry
d) Optionally curing the treated fiber based material at a temperature of between 0-250° C.

An important feature of the present fluorocarbon free emulsion is that as soon as it has been applied the dry and/or cured material becomes immediately hydrophobic and the resulting emulsion is stable not only in concentrated form but also in large dilutions with water which enables efficient add-on control on the treated material hence reducing costs. If normally used surfactants are being included in the emulsion, they will influence the hydrophobicity in a negative way while they will be on the surface. They need to be cleansed away from the treated surface in order to give a hydrophobic surface. Thus in such a case an extra step is needed.

If an inorganic, organic or fiber based materials, has a negatively loaded surface, for example such as cellulose based materials are being used, there will be a natural attraction of the nitrogen in the amino functional organosiloxane, which will point against the material. In this way the hydrophobic part of the amino siloxane will point out from the treated material and the material will be hydrophobic.

It is a further object of the present invention to provide a chemical composition composed of a liquid solution consisting of amino functional organosiloxane, hydrolysable alkylsilane, an acidic, a defoamer, a coalescent agent and only water as solvent, wherein given optional additives, co-emulsifier and/or catalyst and/or preservative and/or rheology modifier and/or fatty acid and/or fatty oil and/or wax, can be added or substitute part of one or more of the compounds of the chemical composition of the invention.

A further object of the invention is to provide means to industrially use the method and the chemical formulation in current production methods of inorganic, organic or fiber based materials, such as textile, non-woven, wood, paper, glass, glass fiber, stone, brick, and the like.

A further object of the invention is provide a chemical composition with low viscosity, broad interval for drying and curing, which causes no or very low yellowing on the treated material, enhances dirt repellency, as well as a soft hand on relevant materials such as textile A further object of the invention is provide a chemical composition which allows for simple manipulations, through the addition or partly substitution of one or more of the compounds of the chemical composition of the invention using said co-emulsifier and/or catalyst and/or preservative and/or rheology modifier and/or fatty acid and/or fatty oil and/or wax, to adjust the properties and effects of the composition on the treated material and drying and curing times and temperatures.

These and other objects, features and advantages of the herein described invention will become more apparent from the following detailed description thereof.

DETAILED DESCRIPTION OF THE INVENTION

According to the invention a method is disclosed for improving water repellency of inorganic, organic or fiber based materials comprising wetting the material in a liquid composition comprising or consisting of an amino functional organosiloxane, hydrolysable alkylsilane, an acid, a defoamer, a coalescent agent and water as solvent, drying and curing the inorganic, organic or fiber based materials at an elevated temperature over a time sufficient to obtain the desired improvement. According to the invention the use of the wording inorganic material may include sand, glass, pumice, slag, metals, minerals, incinerator ash, kiln dust, perlite, mortar, cements, calcined materials, incinerator ash, pulverized industrial slag and earthen materials such as gravel, sand, stone, brick and pulverized igneous and metamorphic rock, oxides and hydroxides of silicon, aluminum, titanium or iron and the like.

According to the invention the use of the wording organic material may include wood such as wood decking, wood studs, planks, wood decking, wood strips, laminated wood such as laminated wood beams, wood facade panels, modified wood, pressure-impregnated wood, veneer and the like, wood based products such as bark, plant leaves, extractives and the like, tree and plant derived stems, fibers and extractives. Other organic materials may include plastics, fiber composites, plastic composites, manure, livestock and poultry manure, sewage sludge, cotton gin trash, cannery wastes, lawn clippings, food wastes, carbon from pyrolysis, cellulose, hemicellulose, lignine based products and the like.

According to the invention the use of the wording fiber based material may include textiles, cloths or fabrics and may according to the present invention be natural and/or synthetic textiles and/or woven and/or non-woven textiles and mixtures thereof. Textiles may consist of a network of natural and/or artificial fibers often referred to as thread or yarn. Yarn is produced by spinning raw fibers of wool, flax, cotton, or other material to produce long strands. Textiles are formed by weaving, knitting, crocheting, knotting, or pressing fibers together (felt). The words fabric and cloth may for example be used in textile assembly trades (such as tailoring and dressmaking) as synonyms for textile. Textile may refer to any material made of interlacing fibers or nonwoven textiles. Fabric refers to any material made through weaving, knitting, spreading, crocheting, or bonding that may be used in the production of further goods (garments, etc.). Cloth may be used synonymously with fabric but often refers to a finished piece of fabric used for a specific purpose (e.g., table cloth). Clothes, accessories and shoes refer to finished piece of fully or partly made out of fabric. The wording textiles according to the present invention may include all different types of textiles described above. Textiles according to the invention can be made from many different types of materials and fibers for example animal (wool, silk, mohair, cashmere, pygora, cameldown, alpaca, ilama, vicuna, guanaco, angora or qiviut etc.), plant (ramie, nettle, milkweed, cotton, linen, flax, jute or hemp) wood; e.g. viscose, etc.), mineral (asbestos, glass fiber etc.), and synthetic (nylon, elastan, polyester, acrylic, polyamide, polypropylene, polyurethane and its derivatives, etc.) and sugar based (corn fiber, coir, *yucca*, sisal or bamboo (rayon) fiber etc.) or protein based fibers from plants (peanut and soy based, chitin based, milk casein based, keratin based or poly lactic acid based). Further, nonwoven materials are fabric-like materials made from long fibers, bonded together by chemical, mechanical, heat or solvent treatment. Nonwoven fabrics are also defined as sheet or web structures bonded together by entangling fiber or filaments (and by perforating films) mechanically, thermally or chemically. The term is used in the textile manufacturing industry to denote fabrics, such as felt, which are neither woven nor knitted. They are flat or tufted porous sheets that are made directly from separate fibers, molten plastic or plastic film.

Other fiber based materials may include paper materials/products which comprise a high degree of cellulose. The pulps for making fiber based materials may be any kind of pulp, i.e. mechanical pulp, thermomechanical pulp, chemo-mechanical pulp, sulphate pulp, sulphite pulp, bleached pulp, unbleached pulp, short-fiber pulp, long-fiber pulp, recycled fibers, mixtures of different pulp grades etc. The invention works irrespective of the kind of pulp chosen.

The method of application of the emulsified solution or composition to the inorganic, organic or fiber based materials according to the invention may be in any suitable manner, for example by soaking, impregnating, padding, foularding, dipping, spraying, brushing, coating, rolling, foam-application, impregnation, vacuum-pressure impregnation process or by other means applying said liquid composition to said materials. Further it is also possible to wash/laundry the materials to be treated with said emulsified liquid composition using a conventional washing machine, also known as wash-in product, or by other machines or for example manually.

The treated inorganic, organic or fiber based materials also show excellent dirt repellency, especially repellency for water soluble/hydrophilic dirt for example but not limited to soil stains or stains of ketchup, coffee or wine or water soluble stains.

The present invention also includes the use of the emulsified solution according to the invention for rendering an inorganic, organic or fiber based materials durable water repellent and/or dirt repellant.

The wording rendering a material durable water resistance or water repellant and/or dirt repellant in the present application means that, for example in the case of textile, the textile material is water resistance or water repellant and/or dirt repellant also after having been washed 5 times or more. A sufficient amount of hydrophobizing agent (siloxane, silane optionally wax, fatty oil, fatty acid) is covalently attached to the coated textile which means that it withstands normal washing conditions without losing its water repellency after wash.

The Emulsified Liquid Composition

The wording emulsified solution or emulsified liquid composition is used referring to the solution which is used to treat the fibre in order to make the fibre durable water resistant and/or dirt repellent. The said emulsified liquid composition according to the invention comprises
a) —one or more amino functional siloxanes of the formula I
b) —one or more hydrolysable alkylsilanes of the formula II
c) an acid
d) water
e) a defoamer
f) a coalescent agent and optionally
g) a preservative, co-emulsifier, catalyst, rheology modifier, fatty acid, oil and wax The ingredients of the liquid composition according to the invention may have any characteristics according to the different alternatives disclosed below:

Amino Functional Organosiloxane "Surfactant"

The amino functional organosiloxane according to the invention is selected from amino functional siloxanes of the formula I Amino functional organosiloxane of the formula I can provide different hydrophobic/hydrophilic ratios depending on % N. % N from amino functional organosiloxanes present in the composition is less than 1.7% N. In one aspect, the amino functional organosiloxanes have 0.01 to 1.6% N or 0.05 to 1.2% N. In one particular aspect, the amino functional organosiloxanes have 0.05 to 0.5% N. In another aspect, the amino functional organosiloxanes have 0.1 to 0.4% N. Another way of getting different hydrophobic/hydrophilic ratios is by mixing a high % N amino functional organosiloxane with a low % N amino functional organosiloxane in the desired proportions suitable for emulsifying a specific oil.

The preferred amino functional organosiloxane of the invention is given by the following formula I

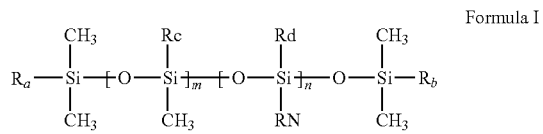

Formula I

Ra, Rb, Rc and Rd which may be identical or different, denote a hydrogen atom, a phenyl, a benzyl, a C1-C32 alkyl group, preferably C1-C22; a C1-C4 alkoxy group, preferably hydrogen, methoxy, ethoxy; or OH; m and n are integers dependent on the degree of polymerization and whose sum is between 1 and 2000 and/or weight-average molecular mass of the compound is between 5000 and 500000.

RN. The amino functional organic group RN is illustrated by groups having the formula;
R3NHR4, —R3NR4$_2$, or —R3NHR3NHR4, wherein each R3 is independently a divalent hydrocarbon group having at least 2 carbon atoms, and R4 is hydrogen or an alkyl group. Each R3 is typically an alkylene group having from 2 to 20 carbon atoms. R3 is illustrated by groups such as; —CH2CH2-, —CH2CH2CH2-, —CH2CH(CH3)-, —CH2CH2CH2CH2-, —CH2CH(CH3)CH2-, —CH2CH2CH2CH2CH2-, —CH2CH2CH2CH2CH2CH2-, —CH2CH2CH(CH2CH3)CH2CH2CH2-, —CH2CH2CH2CH2CH2CH2CH2CH2-, and —CH2CH2CH2CH2CH2CH2CH2CH2CH2CH2-. The alkyl groups R4 are as illustrated above for R. When R4 is an alkyl group, it is typically methyl.

Some examples of suitable amino-functional hydrocarbon groups are;
—CH2CH2NH2, —CH2CH2CH2NH2, —CH2CH(CH3)NH2, —CH2CH2CH2CH2NH2,
—CH2CH2CH2CH2CH2NH2,
—CH2CH2CH2CH2CH2CH2NH2,
—CH2CH2NHCH3, —CH2CH2CH2NHCH3, —CH2CH(CH3)CH2NHCH3,
—CH2CH2CH2CH2NHCH3,
—CH2CH2NHCH2CH2NH2,
—CH2CH2CH2NHCH2CH2NH2,
—CH2CH2CH2NHCH2CH2CH2NH2,
—CH2CH2CH2CH2NHCH2CH2CH2NH2,
—CH2CH2NHCH2CH2NHCH3,
—CH2CH2CH2NHCH2CH2CH2NHCH3,
—CH2CH2CH2CH2N HCH2CH2CH2CH2NHCH3, and
—CH2CH2NHCH2CH2NHCH2CH2CH2CH3.

Alternatively, the amino functional group is —CH2CH(CH3)CH2NHCH2CH2NH2 or
—CH2CH2CH2NHCH2CH2NH2.

Also branched polydimethylsiloxanes are included.

In another embodiment the amino functional organosiloxane is selected from any of or a combination of any of; Amino functional organosiloxane (BC99/046 (Amin content of 1.6%, sold by KCC Basildon Chemicals), Hansa care 9040 (Amin content of 0.4% sold by CHT/BEZEMA group), Silamine T-97 (Amin content of 0.22% sold by Siltech Corporation), Hansa care 8014D (Amin content of 1.5% sold by CHT/BEZEMA group), CFF 2010(Amin content of 0.3% sold by Flexichem Pty Ltd), WACKER® L 655 SILICONE FLUID (Amin content of 1.4% sold by Wacker Chemie AG).

In a preferred embodiment according to the invention, the concentration of the amino functional organosiloxanes in the composition are in the range of 0.01-20 w/w %, or between 0.05-15 w/w % or between 0.1-10 w/w % or between 0.2-8 w/w % for example 3 w/w % compared to the total amount of composition in order to provide excellent hydrophobicity and composition stability (during the material modification process).

Hydrolysable Alkylsilane:

The hydrolysable alkylsilane according to the invention is selected from the group of hydrolysable alkylsilane of the formula II $$_m(R'O)Si(R'')_n$$ Formula II, wherein

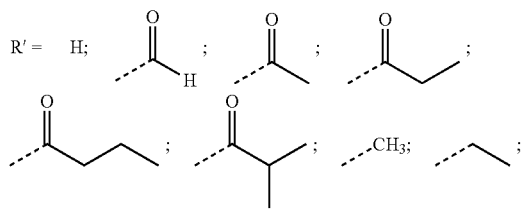

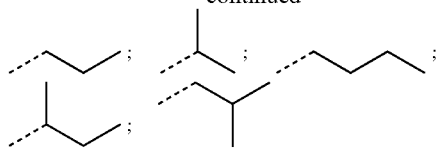

$R''=C_3-C_{30}$

Compounds of the formula II are especially, but not limited to, selected from hexadecyltrimethoxy silane, hexadecyltriethoxy silane, octyltrimethoxy silane, octyltriethoxy silane and octadecyltrimethoxy silane and mixtures thereof.

The hydrolysable alkylsilane of the invention can be used alone or be a mixture of several kinds of hydrolysable alkylsilane mixed in different proportions and may further have any characteristics according to the different alternatives disclosed below. The sum of the m+n must be 4 while $m \geq 1$.

In one embodiment the hydrolysable group of the alkylalkoxysilane R' of the liquid composition according to the invention is chosen from hydroxyl (R'=H) or alkoxy groups comprising 1-4 carbons or for example comprising 2-3 carbons, or for example selected from acetoxy, methoxy, ethoxy, propoxy (for example n-propoxy, isopropoxy) or butoxy groups (for example n-butoxy, isobutoxy or tert butoxy). In one embodiment, the alkyl group R" of the hydrolyable alkylsilane is chosen from propyl, hexyl, octyl, decyl, dodecyl, tetradecyl, hexadecyl, octadecyl and icosa.

In one embodiment, the hydrolysable alkylsilane of choice in the preferred composition is chosen from the class of alkyltrialkoxysilanes for example n-, iso or mixtures thereof, of hexadecyltrimethoxy silane, hexadecyltriethoxy silane, octyltrimethoxy silane, octyltriethoxy silane and octadecyltrimethoxy silane (examples of suitable hexadecyltrimethoxy silanes, may be one comprising linear carbon chains or is called n-hexadecyltrimethoxy silane or a branched silane iso-hexadecyltrimethoxy silane alternatively a mixture of branched and linear silane is useful).

In one embodiment the emulsified composition according to the invention comprises a hydrolysable alkylsilane with an alkyl chain with a number of carbon atoms higher or equal to 3 but equal to or less than 30 carbon atoms. Said alkyl chain on the hydrolysable alkylsilane is for example a straight and saturated carbon chain to allow better packing of the chains at the cellulosic material interface, but branched, cyclic and/or non-saturated chains are also conceivable according to the invention. According to other embodiments the emulsified composition according to the invention comprises a hydrolysable alkylsilane with an alkyl chain with a number of carbon atoms higher or equal to 3 but equal or less than 30, or for example with a number of carbon atoms higher than 6 and less than 30 or for example with an alkyl chain with a number of carbon atoms equal or higher than 8 and less than 18.

In another embodiment the emulsified composition according to the invention comprises a hydrolysable alkylsilane with an alkyl chain which is branched, linear or cyclic with a number of carbon atoms higher or equal to 3 but equal or less than 30, or for example with a number of carbon atoms higher than 7 and less than 18 or for example with an alkyl chain with a number of carbon atoms equal or higher than 8 and less than 18.

In one embodiment the alkylalkoxysilane, said alkyl is straight or branched, saturated or unsaturated $C_3$-$C_{30}$ alkyl, or $C_8$ to $C_{18}$ alkyl and the alkoxy group is a acetoxy, methoxy, ethoxy, propoxy (for example n-propoxy, isopropoxy) or butoxy groups (for example n-butoxy, isobutoxy or tert butoxy).

Said alkyl chain on the alkylalkoxy silane is preferably straight and saturated to allow better packing of the chains at the cellulosic material interface, but branched, cyclic and/or non-saturated chains are also conceivable. More preferred is an alkyltrialkoxysilane wherein said alkyl is straight or branched $C_8$-$C_{18}$ alkyl. Most preferred is alkyltrialkoxysilane wherein said alkyl is straight or branched and a mixture of $C_8$ and $C_{16}$ alkyl, for example hexadecyltrimethoxysilane and octyltriethoxysilane.

In a preferred embodiment according to the invention, the concentration of the alkylalkoxysilane in the composition shall be in the range of 1-22 w/w %, or between 4-12 w/w % or for example 5.5 w/w % compared to the total amount of composition in order to provide excellent hydrophobicity and composition stability (during the material modification process).

Acid/Co-Catalyst

The acid in the present invention has a dual functionality. It is used for protonating the amino functional organosiloxane and for catalyzing the reaction of the oil phase with the treated material.

The acid comprised in the emulsified composition according to the invention is selected from a Brønsted acid or a Lewis acid. In one embodiment the acid comprised in the emulsified composition according to the invention is chosen from the class of acids which are readily soluble in water solvent, with the additional requirements of pKa <7, and being active within the system throughout the application process. Additionally, the chosen acid should not interfere with the water repellency effect of the material after treatment. In another embodiment the pKa of the acid is between 1.5-5.0 or between 1.9-4.9. A pKa of the acid catalysts below 1.9 may lead to discoloring of the textile but still gives good effect of water repellency and dirt repellency. The acid of choice in the formulation is chosen from the group of acids which are readily soluble in water. The acids should have pKa<7 and they must remain active within the system during the application process. In one embodiment of the invention the acid is selected from an organic acid. Examples of acidic catalysts that are useful to be comprised in the emulsifying composition according to the invention are para-toluenesulfonic acid, benzenesulfonic acid, camphorsulfonic acid, stearic acid, malic acid, maleic acid, glyoxylic acid, citric acid, formic acid, pyruvic acid, tartaric acid, phtalic acid, acetylsalicylic acid, salicylic acid, lactic acid, dihydroxy fumaric acid, mandelic acid, malonic acid, glycolic acid, acetic acid, succinic acid, hydrochloric acid, sulfuric acid and oxalic acid. In one embodiment of the invention the acid is selected from an organic acid which is non-toxic. In a preferred embodiment of the invention, the amount of acid is equal or less than 8% (w/w). In the most preferred embodiment of the invention, acids with pKa less than 5 or pKa between 1.9-4.9 are used; the amount of the acid catalyst in the composition is then less than 7 w/w % or between 1-7 w/w % in relation to the emulsified liquid composition.

Catalyst

The catalyst in the present invention has a dual functionality. It can act as a Lewis acid catalyzing the hydrolysis and condensation of the silane and as an adhesion promoter/crosslinker where it can catalyze the making of bonds between fibers and hydrophobic agent. The catalyst comprised in the emulsified composition according to the invention is selected from Zirconium acetate solution, zirconium acetate powder, zirconium propionate, Zirconium acetate hydroxide, Zirconium ammonium carbonate, zirconium neodecanoate, Aluminium sulphate, Aluminium Stearate, Zinc sulphate, platinum based catalyst such as Karstedt catalyst, platinum chloride olefin complex, Pt-96 catalyst, Tin catalyst such as wacker C 38 from Wacker chemie AG, Iron sulfate, Tannic acid, Sodium chloride and mixtures thereof. The preferred catalysts are chosen from zirconium based catalysts. In one embodiment the catalyst comprised in the emulsified composition according to the invention is chosen from the class of catalyst which are readily soluble in water solvent, with the additional requirement being active within the system throughout the application process. Additionally the chosen catalyst should not interfere with the water repellency effect of the material after treatment nor the stability of the emulsion over a prolonged period of time. In a preferred embodiment of the invention, the amount of catalyst is equal or less than 8% (w/w). In the most preferred embodiment of the invention, catalysts are used in the amount of less than 7 w/w % or between 0.05-4 w/w % in relation to the emulsified liquid composition.

Co-Emulsifier/Co-Surfactant

The wording co-emulsifier may according to the present invention also refer to any surfactant, a thickener or a stabilizer. An emulsifier may be ionic or non-ionic. The emulsifier is added to the emulsified liquid composition in order to emulsify and stabilize the liquid composition. The emulsifier may be chosen to not discolor the chosen treated material and/or to not affect the strength or the water repellent effect of the treated material. The emulsifier may be chosen from the class of surfactants which is non-ionic emulsifiers having HLB values between 1-41 and that have the ability to aid to emulsify of the hydrophobizing agents in water. In one embodiment according to the invention the emulsifier is a surfactant with a HLB value between 7-18 which may be used together with surfactants with HLB values between 35-41. In one embodiment the emulsifier is not affecting the reactivity of the catalyst and the hydrophobizing agent. According to the most preferred embodiment of the invention, surfactants with HLB 9-15 are used.

In one embodiment the emulsifier is a surfactant that has an HLB value 1-41, selected from any of or a combination of any of;

carboxylic acids having 9-20 carbon atoms; aliphatically substituted benzene/aromatic sulfonic acids having at least 6 carbon atoms in the aliphatic substituents; aliphatic sulfonic acids having at least 6 carbon atoms in the aliphatic substituents; aliphatically substituted diphenyl ether sulfonic acids having at least 6 carbon atoms in the aliphatic substituents; alkyl hydrogen sulfates having at least 6 carbon atoms in the alkyl substituents; alkyl and alkylarylether sulfates having at least 6 carbon atoms in the hydrophobic radical and 1 to 40 ethylene oxide (EO) and/or propylene oxide (PO) units; taurides; esters and monoesters of sulfosuccinic acid with monohydric alcohols or alkylphenols having 4 to 15 carbon atoms, optionally ethoxylated with from 1 to 40 EO units; and also alkali metal and ammonium salts of the acids mentioned; phosphoric partial ester and their alkali metal and ammonium salts, particularly alkyl and alkylaryl phosphates having 8 to 20 carbon atoms in the organic radical; alkyl ether and alkylaryl ether phosphates having 8 to 20 carbon atoms in the alkyl radical and alkylaryl radical respectively and from 1 to 40 EO units; salts of primary, secondary and tertiary fatty amines having 8 to 24 carbon atoms with acetic acid, sulfuric acid, hydrochloric acid and phosphoric acids; quarternary alkyl- and alkylbenzeneammonium salts, more particularly those whose alkyl chain has up to 18 carbon atoms, specifically the halides sulfates phosphates and acetates; alkyl polyglycol ethers, preferably those having from 3 to 40 EO units and alkyl radicals of 8 to 20 carbon atoms, alkylaryl polyglycol ethers, preferably those having from 5 to 40 EO units and from 8 to 20 carbon atoms in the alkyl and aryl radicals; ethylene oxide-propylene oxide (EO-PO) block copolymers, preferably those having from 8 to 40 EO and/or PO units; addition products of alkylamines having alkyl radicals of 8 to 22 carbon atoms with ethylene oxide or propylene oxide; alkylpolyglycosides; natural substances and derivatives thereof, such as lechithin, lanolin, saponines, cellulose; cellulose alkyl ethers and carboxyalkylcelluloses; linear organo(poly)siloxanes containing polar groups containing more particularly the elements O, N, C, S, P, more particularly those having alkoxy groups having up to 24 carbon atoms and/or up to 40 EO and/or PO groups; amino acids substituted with long chains substituents such as N-alkyldi (aminoethyl)glycine or N-alkyl-2-aminopropionic acid salt; betaines, such as N-(3-acylamidopropyl)-N,N-dimethylammonium salts having a C8-C18 acyl radical and alkylimidazolium betaines.

In another embodiment the co-emulsifier is selected from any of or a combination of any of; ethoxylates of saturated 1SO—C13 alcohol (Lutensol TO type sold by BASF corp.) and Hydrenol D (Alcohols, C16-18), sold by BASF Corp, Tegosoft PC 41 (polyglycerol esters of capric acids), sold by Evonik Industries AG.

In a preferred embodiment of the invention, co-emulsifiers are used in the amounts of less than 7 w/w % or between 0.01-4 w/w %, most preferably 0.1-3 w/w %

Water

Water is present in the emulsified liquid composition as a solvent, for example in amounts of 49-99.9 w/w %.

Coalescent Agent

The coalescent compounds are present in order to enhance the stability and the the film forming properties of said emulsion. Examples of suitable coalescent agents include, but are not limited to, Butyldiglycol, iso-propanol, ethanol, acetone, ethylacetate, benzoic acid alkyl esters, ester-alcohols, glycol-ether type solvents, glycol ether esters, long-chain aliphatic alcohols, aromatic alcohols and mixtures thereof. Examples of benzoic acid alkyl esters include benzoic acid alkyl esters where the alkyl group, which can be straight or branched, substituted or unsubstituted, has from about 2 to about 30 carbon atoms, such as decyl or isodecyl benzoate, nonyl or isononyl benzoate, octyl or isooctyl benzoate, 2-ethylhexyl benzoate, tridecyl or isotridecyl benzoate, 3,7-dimethyloctyl benzoate, 3,5,5-trimethylhexyl benzoate, mixtures thereof, and the like. Specific commercial examples of such benzoic acid alkyl esters include VELTA® 262 (isodecyl benzoate) and VELTA® 368 (2-ethylhexyl benzoate), available from Vlesicol Chemical Corporation. Examples of ester-alcohols include hydroxyalkyl esters of alkanoic acids where the alkyls group, which can be straight or branched, substituted or unsubstituted, independently have from about 2 to about 30 carbon atoms, such as 2,2,4-trimethylpentane-1,3-diol monoisobutyrate. Specific commercial examples of such ester-alcohols include TEXANOL® (2,2,4-trimethylpentane-1,3-diol monoisobutyrate) available from Eastman Chemical Company. Examples of glycol-ether type solvents include diethylene glycol monomethylether acetate, diethylene glycol monobutylether acetate, butyl carbitol acetate (BCA), and the like. Examples of long-chain aliphatic alcohols include those where the alkyl group is from about 5 to about 20 carbon atoms, such as ethylhexanol, octanol, dodecanol, and the like. Examples of aromatic alcohols include benzyl alcohol, and the like.

In preferred embodiment of the invention the coalescent agent is selected from any of or a combination of any of; Butyldiglycol, glycol-ether type solvents, glycol ether esters and acetone.

In a preferred embodiment of the invention, coalescent agent is used in the amounts of 0.01-20 w/w %, more preferably in the amounts of 0.5-6 w/w %, most preferably in the amounts of 1.5-3 w/w %.

Defoamer/Antifoaming Agent

The defoamer is present in order to give less foaming during the production and application of the emulsion. Examples of suitable defoamers include, but are not limited to, EO/PO type defoamers, silicones, tri-butyl phosphate, alkylphthalates, emulsion type defoamers, fatty acid based defoamers and the like. In a preferred embodiment Displeair CF 56 (Oy Chemec Ab (Ltd) is used.

In a preferred embodiment of the invention, a defoamer is used in the amounts of 0.05-10 w/w %, especially in the amounts of 0.1-0.5 W/W %.

Preservative/Biocide

Preservative/biocides are present in order to enhance storage stability and protect against microbial attacks. Examples of suitable preservative/biocide include, but are not limited to, one or more preservatives selected from one or more of fungicide, bactericide, pharmaceutical preservative, cosmetic preservative and food preservatives. The concentration of the preservative is 0.005-10 wt %, preferably 0.005-1.5 wt %, more preferably 0.005-0.5 wt %. Moreover, the preservative is preferably biodegradable and/or renewable. Food preservatives, pharmaceutical preservatives and cosmetic preservatives are preferred since they are non-toxic. The inclusion of a preservative helps to inhibit the growth of mold in the chemical composition of the invention.

The food preservative can be selected from benzoic acid, sodium benzoate, hydroxybenzoate and derivatives thereof, lactic acid, propionic acid and sodium propionate, sulfur dioxide and sulfites, sorbic acid and sodium sorbate, ascorbic acid, sodium ascorbate, butylated hydroxytoluene, butylated hydroxyanisole, gallic acid and sodium gallate and tocopherols.

A fungicide or bactericide such as 1,2-benzisothiazolin-3-one can be included in the chemical composition of the invention. Moreover, a cosmetic preservative such as 2-methyl-4-isothiazolin-3-one can either alone, or in combination with 1,2-benzisothiazolin-3-one be included in the chemical composition of the invention. Furthermore, a pharmaceutical preservative such as 2-Bromo-2-nitro-1,3-propanediol can either alone or in combination with either one of, or both of 1,2-benzisothiazolin-3-one and 2-methyl-4-isothiazolin-3-one be included in the chemical composition of the invention.

Rheology Modifier

Rheology modifiers can be used in order to change the rheology profile to fit a specific type of application method. Examples of rheology modifiers include, but not limited to, fumed hydrophobic (Wacker HDK H30RM) and hydrophilic silica nanoparticles (Wacker HDK V15) (Wacker chemie AG), biopolymer based rheology modifiers such as carboxymethyl cellulose and the like. The rheology modifier can be used individually or in combination in amounts up to 5% w/w, more preferable in amount of 0.1-2% w/w, most preferable 0.0015-0.15% w/w.

Fatty Acids

Fatty acids can be present in order to enhance emulsion stability and to boost water repellence performance. Examples of fatty acids are, but not limited to, linear or branched C4-C40 carboxy acid, preferably selected from the group consisting of caproic acid, caprylic acid, capric acid, lauric acid, myristic acid, palmitic acid, stearic acid, arachidic acid, behenic acid, lignoceric acid, myristoleic acid, palmitoleic acid, oleic acid, octanoic acid, gadoleic acid, erucic acid, ricinoleic acid, linoleic acid, linolenic acid, licanic acid, clupanadonic acid, tall oil fatty acid, oleine palm, oleine soya, distilled or non-distilled soy bean oil fatty acid, distilled or non distilled sunflower oil fatty acid, conjugated or non-conjugated sunflower oil fatty acid, more preferably selected from linoleic acid, palmitic acid Stearic acid, oleic acid, tall oil fatty acid, octanoic acid, ricinoelic acid, most preferably selected from stearic acid, linoleic acid, ricinoelic acid and oleic acid, and mixtures thereof. The fatty acid may as well be in form of its corresponding salt, such as potassium palmate, potassium tallate, potassium cocoate, sodium palmate, sodium tallate, sodium cocoate, and mixtures thereof.

The fatty acids can be used individually or in combination in amounts up to 15% w/w, more preferably in amounts of 0.25-6% w/w, most preferable in amounts of 0.25-3% w/w.

Fatty Oils

Fatty oils can be present in order to enhance water repellence performance. Examples of fatty oils are, but not limited to, sunflower oil, soy bean oil, corn oil, cottonseed oil, palm oil, oleine palm oil, palm kernel oil, tall oil, pine oil, peanut oil, rapeseed oil, safflower oil, sesame oil, rice bran oil, coconut oil, canola oil, avocado oil, olive oil, linseed oil, grape seed, groundnut oil, rice bran oil, perilla oil, tsubaki oil, hemp seed oil, tung oil, kapok oil, tea seed oil, almond oil, aloe vera oil, apricot kernel oil, baobab oil, calendula oil, corn oil, evening primrose oil, grape oil, grape seed oil, hazelnut oil, jojoba oil, macadamia oil, natural oils, neem oil, non-hydrogenated oils, partially hydrogenated oils, sesame oil, or similar, epoxidized vegetable oils such as epoxidized soya bean oil, epoxidized fatty acid methyl esters, and mixtures thereof.

The fatty oil may as well be an essential oil, selected from the group consisting of oils extracted from Aniseed, Basil, Benzoin, Bergamot, Black Pepper, Camphor, Carrot, Cedarwood, Chamomile German, Chamomile Maroc, Chamomile Roman, Cinnamon Leaf, Clove Buds, Cypress, Dill, *Eucalyptus Globulus*, Fatigue, Fennel, Frankincense, Ginger, Grand Fir, Grapefruit, Grapeseed, Hazel, Hyssop, Jojoba, Juniper, Juniper Berry, Lavender, Lemon, Lemon Grass, Melissa, Mountain Savoury, Myrtle Red, Neroli, Niaouli, Patchouli, Peppermint, Pine, Red Myrtle, Rescue Remedy, Rose Geranium, Rosemary, Sandlewood, Spanish Marjoram, Sweet Marjoram, Sweet Thyme, *Tagetes*, Tea Tree, Thyme Red, Thyme Sweet, Ylang Ylang, and mixtures thereof.

The fatty oil may be an animal oil, preferably selected from the group consisting of animal fat or oil, sperm oil, lard, tallow, fish or whale oil, fish liver oil, milk fat, wool oil, wool grease, lanolin, bone oil, lard oil, goose grease, preferably selected from fish oil and bone oil, and mixtures thereof.

The fatty oil may as well be a polymerized natural oil, preferably selected from any polymerized oil as described above, such as polymerized soy bean oil, and mixtures thereof. The fatty oil may be a synthetic oil, preferably selected from the group consisting of pure or blends of light mixtures of high alkanes from a mineral source such as mineral oil, white oil, liquid paraffin, and liquid petroleum, full synthetic oil, poly-alpha-olefin (PAO) oil, Group V base oil, Group I-, II-, II+-, and III-type of mineral-base oil (as defined by API), semi-synthetic oil such as mixture of mineral oil and synthetic oil, and mixtures thereof.

The fatty oil is more preferably selected from sunflower oil, soy bean oil, tall oil, corn oil, rapeseed oil, coconut oil and palm oil Castor oil, sunflower oil, polymerized soya bean oil, liquid paraffin and mineral oil, most preferably selected from sunflower oil, soy bean oil, corn oil, rapeseed oil, coconut oil and palm oil, Castor oil, sunflower oil and polymerized soya bean oil, and mixtures thereof.

The fatty oils can be used individually or in combination in amounts up to 15% w/w, more preferably in amounts of 0.25-6% w/w, most preferable in amounts of 0.25-3% w/w.

Wax

Waxes can be present in order to enhance emulsion stability and to boost water repellence performance. Examples of waxes are, but not limited to, synthetic waxes such as non-reactive and reactive Alkyl modified silicone wax BC 99/30 (Basildon Chemicals), Silwax J1032, Silwax D221M, Silwax J226 (Siltech Corporation), Hydroxyl modified silicone wax such as Silmer OH J10, Silmer OHT E13 (Siltech Corporation), beeswax, wool wax, insect secrete wax such as chinese wax, candellia wax, ozocerite, *Oryza sativa* (rice) bran wax, japan wax, carbowax, Fischer-Tropsch waxes, carnauba wax, ouricury wax, jojoba wax, joyoba esters, vegetable wax (copernica cerifera), cetyl esters, spermaceti. thembroma cacao (cocoa) seed butter, palm wax, bayberry wax, castor wax, esparto wax, japan wax, rice bran wax, soy wax, tallow tree wax, paraffin wax, montan wax, ceresin wax, ozocerite, peat wax, microcrystalline wax, and mixtures thereof, preferably selected from BC 99/30, Silwax J1032, Silwax D221M, Silwax J226, Silmer OH J10, Silmer OHT E13, bees wax, wool wax, candellia wax, carnauba wax, jojoba wax, palm wax, castor wax, and soy wax, and mixtures thereof.

The waxes can be used individually or in combination in amounts up to 15% w/w, more preferably in amounts of 0.5-6% w/w, most preferable in amounts of 1-4% w/w.

Chain Extender/Crosslinkers

Chain extender/cross-linker can be used in order to introduce new chemical bonds and boost chemical bonding/durability of the hydrophobizing agents and other functional chemicals in the invention together or to the applying surfaces. Example of chain extender/crosslinkers are blocked prepolymer based on isocyanates (such as Ruco-Link Bew 4945 manufactured by Rudolf Chemie or Phobol XAN manufactured by Huntsman) but not limited to them.

As will be understood by those skilled in the present field of art, numerous changes and modifications may be made to the above described and other embodiments of the present invention, without departing from its scope as defined in the appending claims.

SUMMARY OF THE INVENTION

The invention is directed to an emulsified liquid composition comprising
a) —one or more amino functional siloxanes of the formula I
b) —one or more hydrolysable alkylsilanes of the formula II
c) an acid
d) water
e) a defoamer f) a coalescent agent and optionally one or more of a preservative, co-emulsifier, catalyst, rheology modifier, fatty acid, oil and/or wax.

One preferred emulsified composition according to the invention comprises the aminosiloxanes as functional organosiloxanes in the composition in the range of 0.01-20 w/w %, or between 0.05-15 w/w % or between 0.1-10 w/w % or between 0.2-8 w/w % for example 3 w/w % compared to the total amount of composition in order to provide excellent hydrophobicity and composition stability during the material modification process.

Another preferred emulsified composition according to the invention comprises the amino functional organosiloxane having a nitrogen content of 0.05% N-5% N, more preferably, 0.05-0.5% N.

Another preferred emulsified composition according to the invention comprises
 a) the aminosiloxanes of the formula I wherein, Ra, Rb, Re and Rd, which may be identical or different, denote a hydrogen atom, a phenyl, a benzyl, a C1-C32 alkyl group, preferably C1-C22; a C1-C4 alkoxy group, preferably hydrogen, methoxy, ethoxy; or OH; m and n are integers dependent on the degree of polymerization and whose sum is between 1 and 2000 and/or weight-average molecular mass of the compound is between 5000 and 50000 and the amino-functional organic group RN is illustrated by groups having the formula; —R3NHR4, —R3NR4$_2$, or —R3NHR3NHR4, wherein each R3 is independently a divalent hydrocarbon group having at least 2 carbon atoms, and R4 is hydrogen or an alkyl group. Each R3 is typically an alkylene group having from 2 to 20 carbon atoms. R3 is illustrated by groups such as; —CH2CH2-, —CH2CH2CH2-, —CH2CH(CH3)-, —CH2CH2CH2CH2-, CH2CH(CH3)CH2-, —CH2CH2CH2CH2CH2-, —CH2CH2CH2CH2CH2CH2-, —CH2CH2CH(CH2CH3)CH2CH2CH2-, —CH2CH2CH2CH2CH2CH2CH2CH2-, and —CH2CH2CH2CH2CH2CH2CH2CH2CH2CH2- and the alkyl groups R4 are as illustrated above for R and when R4 is an alkyl group, it is typically methyl;
 b) the hydrolysable alkylsilanes of the formula II $$_m(R'O)Si(R'')_n \quad \text{Formula II,}$$

wherein

R' = H; (various acyl/alkyl groups shown)

R''=C$_3$-C$_{30}$ and the sum of the m+n must be 4, while m≥1 c) an acid which is a Brønsted or Lewis acid with a pKa<7
d) water is present in amounts of 49-99.9 w/w %
e) the defoamer is present in an amount of 0.05-10 w/w % and
f) the coalescent agent is butyldiglycol.

An emulsified composition according to the invention additionally comprises a co-surfactant.

An emulsified composition according to the invention additionally comprising a catalyst.

An emulsified composition according to the invention, wherein the catalyst is Zirconium.

An emulsified composition according to the invention additionally comprising preservative.

An emulsified composition according to the invention additionally comprising a rheology modifier.

An emulsified composition according to the invention additionally comprising a fatty acid.

An emulsified composition according to the invention additionally comprising a fatty oil An emulsified composition according to the invention additionally comprising a wax.

A method of obtaining the emulsified composition according to the invention, wherein the ingredients
 a) —one or more amino functional siloxanes of the formula I
 b) —one or more hydrolysable alkylsilanes of the formula II
 c) an acid
 d) water
 e) a defoamer
 f) a coalescent agent and optionally one or more of a preservative, co-emulsifier, catalyst, rheology modifier, fatty acid, oil and/or wax are mixed in any order and thereafter optionally mixed and/or homogenized.

A method of obtaining the emulsified composition according to the invention, wherein the method comprises the steps of
a) Adding the amino functional organo siloxane, the hydrolysable alkylsilane and the defoamer to water,
b) Adding the acid to the coalescent agent and to the resulting mixture in step a),
whereafter the resulting mixtures in steps a-b are optionally mixed and/or optionally homogenized.

A method of obtaining the emulsified composition according to the invention, wherein the method comprises the steps of:
a) Adding the amino functional organosiloxane, the hydrolysable alkylsilane, acid and the defoamer to water,
b) Adding the coalescent agent to the resulting mixture in step a,
wherein the resulting mixtures in steps a-b are optionally mixed and/or optionally homogenized.

A method of obtaining the emulsified composition according to the invention, wherein the method comprises the steps of:
a) Adding the amino functional organosiloxane, the hydrolysable alkylsilane, the acid and the defoamer to water,
b) Adding the coalescent agent to the resulting mixture in step a,
wherein the resulting mixtures in steps a-b are optionally mixed and/or optionally homogenized.

An application method of enhancing the water repellence of an inorganic, organic or fiber based materials and/or enhancing the treated material's ability to repel water soluble dirt, comprising
a) adding a composition according to the invention to said inorganic, organic or fiber based material
b) optionally adjusting the amount of composition applied c) drying the treated inorganic, organic or fiber based materials until dry and d) optionally curing the treated inorganic, organic or fiber based materials at a temperature of between 0-250° C., more preferably for consumers 10-90° C., especially 15-60° C. and for industry 90-250° C., most preferred for industrial use 90-19° C.

An application method according to the invention in which the fiber based material is a nonwoven or woven textile and the composition is added to said material with an industrial foulard/padder.

An application method according to the invention in which the fiber based material is a nonwoven or woven textile and the composition is added to said material by adding it into a washing machine.

An application method according to the invention in which the fiber based material is a nonwoven or woven textile and the composition is added to said material by spraying it onto said material.

An application method according to the invention in which the composition is added to said fiber based material by brushing or rolling it onto said material.

Use of the emulsified composition according to the invention to treat inorganic, organic or fiber based materials in order to give said material water repellent characteristics.

Use of an emulsion according to the invention for enhancing water repellence of a fiber based materials.

An apparatus comprising an emulsion according to the invention suitable for enhancing water repellence of fiber based materials.

A fiber based material treated with the composition according to any of the claims 1-11 and the application method according to any of the claims 17-21.

DESCRIPTION OF PREFERRED EMBODIMENTS

Apparatus:
Wichelhaus WI-LD3642 Minidryer/Stenter manufactured by Wichelhaus GmbH & Co.
Wichelhaus WI-MU 505 A horizontel padder manufactured by Wichelhaus GmbH & Co.
Lab centrifuge manufactured by WIFUG Company.
Microfluidizer LM 10 manufactured by Microfluidics Corp.
Molecola Homogenizer manufactured by BERTOLI Company. Others . . . .
Drying and heating chamber Avantgarde ED 115 manufactured by BINDER GmbH.
Laboratory drying oven and incubator Incucell, L LSIS-B2V/IC 55 manufactured by MMM Group.
Wascator FOM 71 CLS Lab Washer, standardized Washing machine manufactured by Electrolux Group.
Tumble Dryer T5130, standardized, manufactured by Electrolux Group.
IKA ultra turrax T 25 digital disperser with S25 N-25G/1713300 dispersing element, manufactured by IKA-Werke GmbH & Co. KG.
IKA ultra turrax T 18 digital disperser with IKA L004640 S 18 N-19 G—dispersing element, manufactured by IKA-Werke GmbH & Co. KG.
Termaks TS 8136 oven.
Phenomenal pH 1000H pH meter, VWR int. LLC.
DV-11 Pro viscometer, manufactured by Brookfield AMETEK.
PGX Serial 50585 contact angle measurement, manufactured by Testing Machines, Inc.

Chemicals used in the examples:
Amino Alkyl Functional Siloxane
BC99/046 (Amine content of 1.6%, sold by KCC Basildon Chemicals)
Hansa care 9040 (Amine content of 0.4% sold by CHT/BEZEMA group)
Silamine T-97 (Amine content of 0.22% sold by Siltech Corporation).
ASE5020 aminosilicone emulsion manufactured by Flexichem Pty Ltd.
Hydrolysable Alkylsilane
KH580/Hexadecyl trimethoxysilane (Zhejiang Feidian Chemical Co., Ltd.)
VP 25013/Hexadecyl trimethoxysilane (Wacker chemie AG)
KH350/Octyl triethoxysilane (Zhejiang Feidian Chemical Co., Ltd)
BS 1601/Octyl triethoxysilane (Wacker chemie AG)
Co-Emulsifiers:
Lutensol TO7 (ethoxylates of saturated 1SO—C13 alcohol, BASF Corp.)
Lutensol TO5 (ethoxylates of saturated 1SO—C13 alcohol, BASF Corp.)
Lutensol TO3 (ethoxylates of saturated 1SO—C13 alcohol, BASF Corp.)
Hydrenol D (Alcohols, C16-18, BASF Corp.)
Tegosoft PC 41 (polyglycerol esters of capric acids, Evonik Industries AG)
Coalescent Agent:
Butyl diglycol (2-(2-BUTOXIETOXI)ETANOL, Univar Inc.)
Acid:
Acetic acid (Univar Inc.)
Malic acid (Thermo Fisher Scientific Inc.)
Succinic acid (Reverdia co.)
Catalyst
Zirconium acetate powder (A.M.P.I. s.r.l.)
Zirconium acetate hydroxide (Sigma-Aldrich Co.)
Defoamers:
Dispelair CF 56 (Oy Chemec Ab)
Preservatives:
Nipaside BSM (Clariant)
Rheology Modifier:
Wacker HDK H30RM, fumed hydrophobic silica (Wacker chemie AG)
Wacker HDK V15, fumed hydrophilic silica (Wacker chemie AG)
Fatty Acids and Oils:
Oleic acid (C 18, unsaturated, Thermo Fisher Scientific Inc.)
SEH 77 30p, Polymerized soya bean oil, Oleon Corporate M&S
Synthetic Waxes:
BC 99/030 non-reactive and reactive Alkyl modified silicone wax (BC 99/030, Basildon Chemicals)
Chain Extender:
Phobol XAN (blocked isocyanate emulsion, Huntsman)
Methods
Determination of resistance to surface wetting (spray test) of fabrics: European Standard EN 24 920 (ISO 4920:1981). Principle: A specified amount of water is sprayed on a textile specimen mounted on a ring. The specimen is disposed at an angle of 45° in respect to the nozzle. The centre of the standardized nozzle is disposed at a given distance above the center of the specimen. A given amount of water is filled in a reservoir disposed above the nozzle and in communication with it. The spray rating is determined visually and/or photographically. The stepwise spray rating scale of ISO 1-5 corresponds to 50-100% of the specimen having withstood wetting. The scale correlation is 100% (ISO 5), 97-5% (ISO −5), 92.5% (ISO+4), 90% (ISO 4), 87.5% (ISO −4), 82.5% (ISO+3), 80% (ISO 3), 77-5% (ISO −3), 72.5% (ISO+2), 70% (ISO 2), 66.67% (ISO −2), 56.67% (ISO+1), 50% (ISO 1) of the specimen having withstood wetting).

Curing of fabrics were made in a preheated Wichelhaus WI-LD3642 Minidryer/Stenter or Termaks TS 8136 oven at given temperatures and times, or room temperature (0-30° C.) hang drying, or tumble drier at different time and temperatures or ironing at given heat. The water-repellency properties of the treated textile before and after machine washing with an aqueous solution of a IEC reference detergent B were evaluated (washing temperature 40° C./duration approximately 90 minutes) by testing the textile with the standardized tests SS-EN 24 920. These examples are intended to illustrate the invention to those skilled in the art and should not be interpreted as limiting the scope of the invention set forth in the claims. All percentages in these examples are weight percentages, unless otherwise indicated:

General procedures of emulsion preparation methods 1-3 according to the invention:

Method 1.
Step a) Adding the amino functional organosiloxane, hydrolysable alkylsilane and defoamer to water,
Step b) Adding acid, coalescent agent to the resulting mixture in step a,
wherein the resulting mixtures in steps a-b are optionally mixed and/or optionally homogenized.

Method 2.
Step a) Adding the amino functional organosiloxane, hydrolysable alkylsilane, coalescent agent and defoamer to water,
Step b) Adding acid to the resulting mixture in step a,
wherein the resulting mixtures in steps a-b are optionally mixed and/or optionally homogenized.

Method 3.
Step a) Adding the amino functional organosiloxane, hydrolysable alkylsilane, acid and defoamer to water,
Step b) Adding coalescent agent to the resulting mixture in step a,
wherein the resulting mixtures in steps a-b are optionally mixed and/or optionally homogenized.

In all the above described methods optionally co-emulsifier and/or catalyst and/or preservative and/or rheology modifier and/or fatty acid and/or fatty oil and/or wax can be added to step a and/or b.

Further, optional water soluble/dispersible additives and/or conventional water based textile additives in emulsion form, can be added to the already finished composition of the invention prior use, such as for example blocked isocyanate emulsions.

Application Methods 1-8 and Evaluation Techniques:

Application methods of the composition of the invention on fabrics, non-woven, paper boards, wood and glass surfaces are described below. These examples are intended to illustrate the invention to those skilled in the art and should not be interpreted as limiting the scope of the invention set forth in the claims.

Method 1. Padder for Fabrics

The emulsions were applied to fabric pieces measuring 25×25 cm by using Wichelhaus WI-MU 505 A horizontal padder. To control the wet uptake the nip pressure or pneumatic load adjustment of the rolls was adjusted to reach an average wet uptake of 40% w/w % in relation to untreated textile. Subsequently the drying/curing was performed using Wichelhaus WI-LD3642 Minidryer/Stenter. All rinsing steps were performed using rinse program of Wascator FOM 71 CLS Lab Washer. All washings were performed using standardzed IEC reference detergent B at 40° C. Wascator FOM 71 CLS Lab Washer. Drying after washes and rinsing were performed using Tumble Dryer T5130 low temperature program, 15 minutes/52° C. The degree of water repellency was determined according to SS-EN 24 920 describe above after conditioning treated fabric samples at 23° C./50% RH for 24 hours.

Method 2. Spraying for Fabrics

The emulsions were sprayed onto fabric pieces measuring 25×25 cm using household spray bottle until saturated. Drying/curing was performed in one of the following procedures; hang drying at room temperature (8-12 hours/23° C.), tumble drying (Tumble Dryer T5130 (low or medium temperature programs, 15-30 minutes)) or ironing (60 seconds household iron, using temperature up to 200° C. without steam). The degree of water repellency was determined according to SS-EN 24 920 describe above.

Method 3. Washing Machine Impregnation for Fabrics

Impregnation using washing machine was performed by hand wash program at 30° C. and addition of 100 g of composition of the invention to the machine detergent compartment. Drying/curing of the impregnated fabric was performed using; hang drying at room temperature (8-12 hours/23° C.), tumble drying (Tumble Dryer T5130 (low or medium temperature programs, 15-30 minutes)) or ironing (60 seconds household iron, using temperature up to 200° C. without steam). The degree of water repellency was determined according to SS-EN 24 920 describe above.

Method 4. Dipping/Squeezing Impregnation for Fabrics

Manual impregnation by dipping/squeezing by hand was performed in order to make water repellent fabrics. Drying/curing was performed using; hang drying at room temperature (8-12 hours, 23° C.), tumble drying (Tumble Dryer T5130 (low or medium temperature programs, 15-30 minutes)) or ironing (60 seconds household iron, using temperature up to 200° C. without steam). The degree of water repellency was determined according to SS-EN 24 920 describe above.

Method 5. Spraying on Paper Board

To pieces measuring 14×14 cm of paper boards, emulsion composition was sprayed using household spray bottle until saturated. Drying/curing was performed by hang drying at room temperature (8-12 hours, 23° C.). The degree of water repellency was determined according to dynamic contact angle measurement and Cobb value standard test.

Dynamic contact angle measurements were performed using PGX Serial 50585 contact angle measuring device on the surfaces of the treated and non-treated paper boards for 120 seconds.

Water absorption test was performed using COBB Tester on the surface of treated and non-treated paper boards for 60 seconds. Water absorption (Cobb value) calculated as mass of water absorbed in a specified time by 1 m2 of paper or paper board at 23° C. and 50% relative humidity.

Method 6. Brush Coating on Wood

The principles of this method is to evaluate how much water wood absorbs after being treated with a hydrophobic coating. This method gives information about how good different coatings withstands water in relation to each other and to a references. The Pine of 100% sapwood was cut into 95×50×21 mm pieces. Two layers of tested emulsions were brush coated on all surfaces of the wood pieces and dried at 30° C. for 24 hours. To evaluate water repellency and surface modification provided by the applied emulsions, dynamic contact angle measurements were performed for 60 seconds using PGX Serial 50585 contact angle measuring device on the surfaces of the treated (according to the invention), non-treated wood and the comparative commercial products in the market. To evaluate water proofing property of the emulsions, water uptake tests of the treated and non-treated wood samples were performed. All the treated and non-treated wood pieces were put to float in a water bath (20 liter plastic box filled with deionized water). Each wood piece was weighed after 24 hours and the percentage of the absorbed water was measured using below equation:

$$\text{Water uptake (\%)} = \left( \frac{m_2 \text{ (weight of wet sample)} - m_1 \text{ (weight of dry sample)}}{m_2 \text{ (weight of dry sample)}} \right) \times 100$$

Method 7. Spraying on Glass Surface

The emulsion was sprayed on horizontal piece of flat non-coated glass, excess emulsion was removed with the help of a damp cloth after 10 minutes and dried/cured at room temperature (23° C.) for 2 hours. To evaluate the water repellency provided by the emulsion, static contact angle measurements were performed for using PGX Serial 50585 contact angle measuring device.

Method 8. Spraying on Non-Woven Paper

The emulsion was sprayed on non-woven paper tissue (KATRIN Basic (25×20.6 cm).) and dried/cured at room temperature (23° C.) for 2 hours. To evaluate the water repellency provided by the emulsion, dynamic contact angle measurements were performed using PGX Serial 50585 contact angle measuring device.

Method for Stability Check of Emulsions

Stability of the emulsions was checked regularly by measuring viscosity (Brookfield DV-11 Pro viscometer) and visually (evaluation of creaming/phase separation) of 250 g of emulsions kept in 250 ml flasks with sealed cap at room temperature (23° C.), 40° C. (Incucell, L LSIS-B2V/IC 55) and 50° C. (Avantgarde ED 115).

EXAMPLES

Comparison of Composition of the Invention to Prior Art Regarding Initial Water Repellency on Treated Materials

TABLE 1

| Compositions | |
| --- | --- |
| Ex 1. | 4 g BC 99-046(1.6% N, 1.6 w/w %); 0.6 g acetic acid (0.24 w/w %), 12.5 g KH580 (5 w/w %), 7 g butyldiglycol (2.8 w/w %), 0.2 g Dispelair CF 56 (0.08 w/w %), 3 g zirconium acetate hydroxide (1.2 w/w %), 222.7 g water (89.08 w/w %). (Total amount = 250 g) |

TABLE 1-continued

| Compositions | |
| --- | --- |
| Comp. Ex 2. | 4.175 g Tegosoft PC 41 (1.67 w/w %); 5.875 g malic acid (2.35 w/w %), 12.5 g KH580 (5 w/w %), "water a" = 125 g, "water b" = 102.45 (90.98 w/w %). (Total amount = 250 g) |

Ex 1 in table 1 was prepared according to preparation method 2. Comparative Ex 2 in table 1 was prepared according to the procedure in patent application WO2014139931 A2.

The emulsions were applied to pieces of fabrics (polyester fabrics (white 100% polyester weave, 128 g/m2) using application procedure method 1. The degree of water repellency was determined according to SS-EN 24 920, see table 3.

TABLE 2

| Wet uptake of treated textile. | |
| --- | --- |
| Emulsion | Wet uptake (%) |
| Ex 1. | 28.2 |
| Comp. Ex 2. | 27.4 |

TABLE 3

| Spray test scores | | | | | | | |
| --- | --- | --- | --- | --- | --- | --- | --- |
| Emulsion | Fabric | dilution | Application method | Curing T(° C.)/ curing time (min) | Before Rinse | After rinse | 5 wash |
| Ex 1 | White 100% polyester weave | Not diluted | Method 1 | 170/2 | 5− | 4+ | 4+ |
| Comp. Ex 2 | White 100% polyester weave | Not diluted | Method 1 | 170/2 | 1 | 4 | 4+ |

According to the results shown in table 3 it can clearly be seen that the composition of the invention achieves an immediate water repellent surface on the material while comparative emulsion Ex 2 requires a rinsing step to remove excess surfactant/emulsifier The durability is unchanged.

Demonstration of Initial Water Repellency, Durability, Dilution and Age Stability on Different Textiles with and without Conventional Textile Chimacal Compositions

TABLE 4

| Composition of Ex 3 | |
| --- | --- |
| Ex 3 | 7.5 g Hansa care 9040(0.4% N, 3 w/w %); 6.25 g acetic acid (2.5 w/w %), 3.75 g KH580 (1.5 w/w %), 10 g KH350 (4 w/w %), 1 g butyldiglycol (0.4 w/w %), 0.25 g Dispelair CF 56 (0.1 w/w %), 3.75 g zirconium acetate hydroxide (1.5 w/w %), 217.5 g water (87 w/w %). (Total amount = 250 g) |

Example 3 in table 4 was prepared according to preparation method 1.

The emulsions were applied to pieces of fabrics according to application method 1. The degree of water repellency was determined according to SS-EN 24 920, see table 5.

TABLE 5

Spray test scores.

| Emulsion | Fabric | Dilution | Additive | Application method | Curing T(° C.)/ curing time (min) | Before Rinse | 1 wash | 5 wash | 10 wash | 15 wash | 20 wash | 25 wash | 30 wash |
|---|---|---|---|---|---|---|---|---|---|---|---|---|---|
| Ex 3 | White 100% polyamide weave | 1:1.25 | — | Method 1 | 170/2 | 5− | 5− | 4+ | 4− | | | | |
| | White 100% polyamide weave | 1:2.5 | — | Method 1 | 170/2 | 4+ | 5− | 4+ | 3 | | | | |
| | White 100% polyamide weave | 1:2.5 | 2% Phobol XAN as Blocked Isocyanate extender | Method 1 | 170/2 | 5− | 5− | 4+ | 4− | | | | |
| | White 100% polyamide weave | 1:5 | 2% Phobol XAN as Blocked Isocyanate extender | Method 1 | 170/2 | 5− | 5− | 4 | 3− | | | | |
| | Grey 100% polyester weave | 1:1.25 | — | Method 1 | 170/2 | 5 | 5− | 5− | 5− | | | | |
| | Grey 100% polyester weave | 1:2.5 | — | Method 1 | 170/2 | 5− | 5− | 4+ | 4 | | | | |
| | Grey 100% polyester weave | 1:2.5 | 2% Phobol XAN as Blocked Isocyanate extender | Method 1 | 170/2 | 5− | 5− | 4+ | 4 | | | | |
| | Grey 100% polyester weave | 1:5 | 2% Phobol XAN as Blocked Isocyanate extender | Method 1 | 170/2 | 5− | 5− | 4 | 3+ | | | | |
| | White 100% Cotton weave* | 1:10 | 2% Phobol XAN as Blocked Isocyanate extender | Method 1 | 170/2 | 4 | 3+ | 2 | 1 | | | | |
| | White 100% Cotton weave | 1:4 | 2% Phobol XAN as Blocked Isocyanate extender | Method 1 | 110/2 drying + 170/2 curing | 4− | 3+ | 3 | 3− | 3− | 3− | 3− | |
| | Red 100% polyester weave | 1:4 | 2% Phobol XAN as Blocked Isocyanate extender | Method 1 | 110/2 drying + 170/2 curing | 4+ | 4+ | 4 | 3+ | 3+ | 3+ | 3− | 3− |
| | White 100% polyester weave | 1:4 | — | Method 1 | 110/2 drying + 170/2 curing | 5 | 5− | 5− | 4+ | | | | |
| | White 100% polyester weave** | 1:5 | — | Method 1 | 110/2 drying + 170/2 curing | 5 | 5 | 5− | 4+ | | | | |
| | White thick 100% polyester weave | 1:20 | — | Method 1 | 110/1 drying + 170/1 curing | 5− | 4− | 3+ | 3+ | 3 | 3 | | |

*Treated fabric is completely proof until 10 washes
**Aged Ex 3 emulsion was used (1 month in 50° C.), no negative effect on dilutability, stabillity and performance could be observed It is shown in table 5 that the emulsion according to the invention Ex 3 is, dilutable, stable over time both as an emulsion but also in performance, and yields high initial spray test scores as well as durability over many washing cycles. By applying Ex 3 a broad range of fiber types can be used in the fabrics. The compatibility with conventional textile chemical compositions such as Phobol XAN is clearly demonstrated.

Synergy when Using a Catalyst

TABLE 6

Emulsions and comparative solution with and without catalyst

| Ex 3 | See table 4 |
|---|---|
| Ex 4 | 7.5 g Hansa care 9040(0.4% N, 3 w/w %); 6.25 g acetic acid (2.5 w/w %), 3.75 g KH580 (1.5 w/w %), 10 g KH350 (4 w/w %), 1 g butyldiglycol (0.4 w/w %), 0.25 g Dispelair CF 56 (0.1 w/w %), 221.25 g water (88.5 w/w %). (Total amount = 250 g) |
| Comp. Ex 5 | 3.75 g zirconium acetate hydroxide (1.5 w/w %), 246.25 g water (98.5 w/w %). (Total amount = 250 g) |

Preparation of Ex 5. In a beaker 1.5 w/w % catalyst (zirconium acetate hydroxide) and water 98.5 w/w % were charged and the mixture was homogenized at 10.000 RPM for 2 minutes using an IKA ultra turrax T 18 digital disperser with IKA L004640 S 18 N-19 G-Dispersing Element.

Emulsions EX 3 and Ex 4 (table 6) were prepared according to the preparation method 1. All the examples listed in table 6 are applied according to application method 1 on polyester fabric (white polyester, 128 g/m2), see table 7. Ex 3 and Ex 4 are examples according to the present invention. The degree of water repellency was determined according to SS-EN 24 920, see table 7.

TABLE 7

Spray test scores

| Label | Fabric | Dilution | Application method | Curing T(° C.)/ curing time (min) | Before Rinse | 1 wash |
|---|---|---|---|---|---|---|
| Ex 3 | White 100% polyester weave | Not diluted | Method 1 | 170/2 | 5− | 5− |
| Ex 4 | White 100% polyester weave | Not diluted | Method 1 | 170/2 | 2 | 3+ |
| Comp. Ex 5 | White 100% polyester weave | Not diluted | Method 1 | 170/2 | 2 | 2 |

According to the results shown in table 7 it can clearly be seen that the emulsion according to the invention comprising zirconium acetate hydroxide as catalyst exhibits increased water repellency.

Flexible Treatment Methods and Drying/Curing Temperatures

TABLE 8

Compositions of the invention

| | |
|---|---|
| Ex 3 | See table 4 |
| Ex 6 | 1.25 g Silamine T-97 (0.2% N, 0.5 w/w %); 6.25 g acetic acid (2.5 w/w %), 3.75 g KH580 (1.5 w/w %), 10 g KH350 (4 w/w %), 1.5 g butyldiglycol (0.6 w/w %), 0.25 g Hydrenol D (0.1 w/w %), 1 g Lutensol TO$_3$ (0.4 w/w %), 1.25 g Oleic acid(0.5 w/w %), 2.5 g BC 90/030(1 w/w %), 3.75 g zirconium acetate hydroxide (1.5 w/w %), 218.5 g water (87.4 w/w %). (Total amount = 250 g) |
| Ex 7 | 7.5 g Silamine T-97 (0.2% N, 3 w/w %); 6.25 g acetic acid (2.5 w/w %), 7.5 g Oleic acid(3 w/w %), 3.75 g zirconium acetate hydroxide (1.5 w/w %), 225 g water (90 w/w %). (Total amount = 250 g) |
| Ex 8 | 7.5 g Silamine T-97 (0.2% N, 3 w/w %); 6.25 g acetic acid (2.5 w/w %), 7.5 g Oleic acid(3 w/w %), 3.75 g zirconium acetate hydroxide (1.5 w/w %), 0.125 g Nipaside BSM (0.05 w/w %). 224.875 g water (89.95 w/w %). (Total amount = 250 g) |
| Ex 9 | 7.5 g Silamine T-97 (0.2% N, 3 w/w %); 6.25 g acetic acid (2.5 w/w %), 7.5 g SEH 77 30p (3 w/w %), 1 g butyldiglycol (0.4 w/w %), 0.25 g Dispelair CF 56 (0.1 w/w %), 3.75 g zirconium acetate hydroxide (1.5 w/w %), 223.75 g water (89.5 w/w %). (Total amount = 250 g) |

Ex 3, Ex 6, Ex 7, Ex 8 and Ex 9 in table 8 were prepared according to preparation method 1.

TABLE 9

Spray test scores

| Label | Fabric | Dilution | Application method | Curing T(° C.)/ curing time (min) | Before Rinse | 1 wash |
|---|---|---|---|---|---|---|
| Ex 3 | White 100% polyamide weave | 1:4 | Method 2 | <55/15 tumble drier | 4+ | 4+ |
| | White 100% polyester weave | 1:4 | Method 2 | <55/15 tumble drier | 5− | 3+ |
| | White 100% polyamide weave | 1:4 | Method 2 | 15/480 hang drying | 4+ | 4+ |
| | White 100% polyester weave | 1:4 | Method 2 | 15/480 hang drying | 5− | 3+ |
| | White 100% polyamide weave | 1:4 | Method 4 | 200/1 ironing | 5− | 4+ |
| | White 100% polyester weave | 1:4 | Method 4 | 200/1 ironing | 5− | 4+ |
| | White 100% polyamide weave | Not diluted | Method 3 | <55/15 tumble drier | 4+ | 5− |
| | White 100% polyester weave | Not diluted | Method 3 | <55/15 tumble drier | 5− | 5− |
| | White 100% polyamide weave | Not diluted | Method 1 | 170/2 | 5− | 4+ |
| | White 100% polyester weave | Not diluted | Method 1 | 170/2 | 5− | 4+ |

TABLE 9-continued

Spray test scores

| Label | Fabric | Dilution | Application method | Curing T(° C.)/ curing time (min) | Before Rinse | 1 wash |
|---|---|---|---|---|---|---|
| Ex 6 | Blue 100% polyamide weave | 1:4 | Method 2 | <65/30 tumble drier | 4 | 4+ |
| | White 100% polyester weave | 1:4 | Method 2 | <65/30 tumble drier | 4 | 4 |
| | Blue 100% polyamide weave | 1:4 | Method 2 | 23/480 hang drying | 3 | 5− |
| | White 100% polyester weave | 1:4 | Method 2 | 23/480 hang drying | 4 | 3+ |
| | Blue 100% polyamide weave | 1:4 | Method 4 | 200/1 ironing | 4 | 5− |
| | White 100% polyester weave | 1:4 | Method 4 | 200/1 ironing | 4 | 4− |
| | Blue 100% polyamide weave | Not diluted | Method 3 | <55/15 tumble drier | 5− | 4+ |
| | White 100% polyamide weave | 1:5 | Method 1 | 170/2 | 5− | 4 |
| Ex. 7 | White 100% polyamide weave | 1:4 | Method 2 | <55/15 tumble drier | 4+ | 4 |
| | White 100% polyester weave | 1:4 | Method 2 | <55/15 tumble drier | 4+ | 4 |
| Ex 8 | White 100% polyamide weave | 1:4 | Method 2 | <55/15 tumble drier | 4+ | 4 |
| | White 100% polyester weave | 1:4 | Method 2 | <55/15 tumble drier | 4+ | 4 |
| Ex 9 | White 100% polyester weave | 1:4 | Method 2 | <55/15 tumble drier | 4 | 4 |

Samples of polyester fabric (white polyester, 128 g/m2), polyamide fabric (white polyamide, 51 g/m2) and polyamide fabric (blue polyamide, 58 g/m2) (see table 9), were treated with emulsions according to table 8, using application methods 1-4. The degree of water repellency was determined according to SS-EN 24 920.

The results in table 9 clearly show that a broad range of drying and curing times can be used to obtain textiles with excellent water repellent. Also the broad range of application methods ranging from consumer friendly wash-in procedures, dipping specimen and squeezing to simple spraying followed by ironing, hang drying and tumble drying is demonstrated. In addition, the industrial feasibility is confirmed by the chosen time and temperature (170° C./2 min) along with the application methods (padder and stenter frame oven). At the same time the broad variation, within the frames of this invention, in the applied emulsions Ex3 and Ex6-9 is clearly demonstrated, by the use of different amino functional siloxane and the inclusion of fatty acid, fatty oil, co-emulsifiers, catalyst and preservative.

Stability Test of the Emulsions

TABLE 10

Stability tests of the Emulsions at different times/temperatures.

| | |
|---|---|
| Comp. Ex 10 | 2.5 g Tegosoft PC 41 (1 w/w %); 8.75 g malic acid (3.5 w/w %), 12.5 g KH580 (5 w/w %), water a = 125.69 g, water b = 100.56 g (90.5 w/w %). pH: 2.137. (Total amount = 250 g) |
| Ex 11 | 4 g BC 99-046 (1.6% N, 1.6 w/w %); 0.6 g acetic acid (0.24 w/w %), 12.5 g KH580 (5 w/w %), 7 g butyldiglycol (2.8 w/w %), 0.2 g Dispelair CF 56 (0.08 w/w %), 225.7 g water (90.28 w/w %). (Total amount = 250 g) |
| Ex 12 | 5 g BC 99-046(1.6% N, 2 w/w %); 0.75 g acetic acid (0.3 w/w %), 15 g KH350 (6 w/w %), 8.75 g butyldiglycol (3.5 w/w %), 0.25 g Dispelair CF 56 (0.1 w/w %), 220.25 g water (88.1 w/w %). (Total amount = 250 g) |
| Ex 13 | 15 g BC 99-046(1.6% N, 6 w/w %); 12.5 g acetic acid (5 w/w %), 20 g KH350 (8 w/w %), 7.5 g KH580 (3 w/w %), 2 g butyldiglycol (0.8 w/w %), 0.5 g Dispelair CF 56 (0.2 w/w %), 3 g Lutensol TO$_5$ (1.2 w/w %), 2 g Lutensol TO$_7$ (0.8 w/w %), 7.5 g Zirconium acetate(3 w/w %), 150 g water (72 w/w %). (Total amount = 250 g) |
| Ex 14 | Dilution stability test: 31.25 g Emulsions at Ex 3 (12.5 w/w %), 218.75 g water (87.5 w/w %). (Total amount = 250 g) |
| Ex 15 | 1.25 g Silamin T-97 (0.2% N, 0.5 w/w %); 6.25 g acetic acid (2.5 w/w %), 3.75 g KH580 (1.5 w/w %), 10 g KH350 (4 w/w %), 1.5 g butyldiglycol (0.6 w/w %), 0.5 g Lutensol TO$_3$ (0.2 w/w %), 0.25 g Hydrenol D (0.1 w/w %), 3.75 g zirconium acetate hydroxide (1.5 w/w %), 2.5 g BC 99/030 (1 w/w %), 220.25 g water (88.1 w/w %). (Total amount = 250 g) |
| Ex 16 | Dilution stability test: 62.5 g Emulsions at Ex 15 (25 w/w %), 187.5 g water (75 w/w %). (Total amount = 250 g) |
| Ex 17 | 15 g BC 99-046(1.6% N, 6 w/w %); 2.25 g acetic acid (0.9 w/w %), 45 g KH350 (18 w/w %), 26.25 g butyldiglycol (10.5 w/w %), 0.75 g Dispelair CF 56 (0.3 w/w %), 160.75 g water (64.3 w/w %). (Total amount = 250 g) |

Comparative Ex 10 in table 10 was prepared according to the procedure in patent application WO2014139931 A2. Emulsion Ex 11 in table 10 was prepared according to preparation method 2. Emulsions Ex 12, Ex.13 and Ex.15 in table 10 were prepared according to preparation method 1. Ex 3 and Ex 15 are diluted with water in the given amount (table 10) to Ex 14 and Ex 16 respectively. The diluted compositions Ex 14 and Ex 16 were thereafter evaluated using same procedure as for Ex 10-13, Ex 15 and Ex 17. Emulsion Ex 17 was prepared according to preparation method 3.

TABLE 11

Visual inspection and viscosity measurements of emulsions at different times and temperatures

| Label | Dilution | pH | Stored at Temp (° C.) | Viscosity mPas Original | Aged |
|---|---|---|---|---|---|
| Comp. Ex. 10 | Not diluted | 2.0 | 23 | ~100 | >100 after a month |
| | | | 40 | ~100 | >100 after a week |
| | | | 50 | ~100 | >100 after a day (gelled) |
| Ex 11 | Not diluted | 4.5 | 23 | ~100 | >100 after a year |
| | | | 40 | ~100 | >100 after 4 months |
| | | | 50 | ~100 | >100 after a month |
| Ex 12 | Not diluted | 3.9 | 23 | ~1.5 | No change in 2 years |
| | | | 40 | ~1.5 | No change in 8 months |
| | | | 50 | ~1.5 | No change in 3 months |
| Ex 13 | Not diluted | 3.1 | 23 | ~1.5 | No change in 2 years |
| | | | 40 | ~1.5 | No change in 8 months |
| | | | 50 | ~1.5 | No change in 3 months |
| Ex 14 | 1 part Ex 3 to 7 parts water | 3.1 | 23 | ~1.5 | No change in 2 years |
| | | | 40 | ~1.5 | No change in 8 months |
| | | | 50 | ~1.5 | No change in 3 months |
| Ex 15 | Not diluted | 3.1 | 23 | ~1.5 | No change in 1 year |
| | | | 40 | ~1.5 | No change in 4 months |
| | | | 50 | ~1.5 | No change in 1 month |
| Ex 16 | 1 part Ex 15 to 3 parts water | 3.2 | 23 | ~1.5 | No change in 1 year |
| | | | 40 | ~1.5 | No change in 4 months |
| | | | 50 | ~1.5 | No change in 1 month |
| Ex 17 | Not diluted | 4.0 | 23 | ~1.5 | No change in 2 years |
| | | | 40 | ~1.5 | No change in 8 months |
| | | | 50 | ~1.5 | No change in 3 months |

According to the results shown in table 11 it can clearly be seen that the emulsions according to the invention could offer long shelf life (up to 2 years) at both concentrated and diluted form which tolerating high temperatures in long terms too.

Softness and Color Change Evaluation

TABLE 12

| | Compositions. |
|---|---|
| Comp. Ex 10 | See table 10 |
| Comp. Ex 18 | 1 g Lutensol TO$_7$ (0.4 w/w %); 1.5 g Lutensol TO$_5$ (0.6 w/w %), 5 g malic acid (2 w/w %), 7.5 g KH580 (3 w/w %), 12.5 g ASE5020 (5 w/w %), 222.5 g water (89 w/w %). (Total amount = 250 g) |
| Ex 3 | See table 10 |

Comparative Ex 10 and 18 in table 10 were prepared according to the procedure in patent application WO2014139931 A2. Emulsions Ex 3 table 12 was prepared according to the preparation method 1.

TABLE 13

Evaluation of the stiffness/softness and yellowing/color change of treated textiles

|  | Fabric | Sensory panel evaluation of softness | Sensory panel evaluation of yellowing |
|---|---|---|---|
| Comp. Ex 10 | White 100% Polyester microfiber weave | 3 | 0 |
| Comp. Ex 18 | White 100% Polyester microfiber weave | 0 | 4 |
| Ex 3 | White 100% Polyester microfiber weave | 0 | 1 |

The treated polyester textiles according to table 13 were submitted for sensory panel evaluation. The sensory panel utilized individuals trained to compare textile products and evaluate softness/stiffness and yellowing/color changes (against original untreated textile). Stiffness was ranked on a scale from 0 describing a very soft hand feel, to 7 describing a stiff hand feel. Color changes/yellowing was ranked on a scale from 0, describing no change, to 7 describing as big visual change. According to the results shown in table 13 it can clearly be seen that the emulsions according to the invention could offer very soft feeling along with very low yellowing on the treated textiles.

Staining Test

A staining test was conducted based on a test method, see below, which includes staining by red wine, coffee, ketchup, freshly squeezed orange juice and dirty snow. The following staining liquids were used; instant coffee (4 g of Nescafe Lyx in 100 ml of boiling water), red wine (12.5% alcohol), freshly squeezed orange juice, Heinz ketchup, and melted dirty snow from road sides of Stockholm highways in Sweden. The materials to be tested in the staining test was a white microfibrous polyester weave (100% polyester, 121 g/m²) which was treated with the given compositions in table 14 according to application method 1 (Ex.3 drying/curing at 170° C./2 min, Ex 7 Spraying 25 w/w % diluted emulsion and subsequently drying/curing with tumble dryer <65° C./30 min) Ex 15 washing machine impregnation 100 g of Ex15 drying/curing with tumble dryer at <55° C./15 min).

TABLE 14

Compositions

| Ex 3 | See table 4 |
|---|---|
| Ex 7 | See table 8 |
| Ex 15 | See table 10 |

TABLE 15

Assessment legend

| Scores | Visual description |
|---|---|
| 1 | Strong mark |
| 2 | Clear mark |
| 3 | Visible mark |
| 4 | Slightly visible mark |
| 5 | No visible mark |

TABLE 16

Staining test results

|  | Coffee 1 h | Coffee 24 h | Red wine 1 h | Red wine 24 h | Orange juice 1 h | Orange juice 24 h | Ketchup 1 h | Ketchup 24 h | Dirty snow 1 h | Dirty snow 24 h | Average scores |
|---|---|---|---|---|---|---|---|---|---|---|---|
| Untreated Weave | 1 | 1 | 1 | 1 | 1 | 1 | 1 | 1 | 2 | 2 | 1.2 |
| Treated weave with Ex 3 | 4 | 3 | 4 | 3 | 4 | 4 | 4 | 3 | 4 | 4 | 3.7 |
| Treated weave with Ex 7 | 4 | 3 | 4 | 3 | 4 | 4 | 4 | 3 | 5 | 4 | 3.8 |
| Treated weave with Ex 15 | 4 | 3 | 4 | 3 | 5 | 4 | 4 | 3 | 5 | 4 | 3.9 |

Both the untreated and the treated weaves were conditioned for 24 hours at 23° C. and 50% relative humidity prior staining test. Two stains of 2 ml of each liquid were added to both the untreated and the treated weaves. After 1 hour one of each polyesters was cleaned with the help of a damp cloth and rinsed under water. After 24 h the second polyester was cleaned in the same manner. The weaves were let to dry for 24 hours at 23° C., then the stains were assessed by putting a white paper under the weaves and assess according to the given scale in table 15. As can be seen in the staining test results, while untreated weaves had average score of 1.2, the treated weaves had averages score of: 3.7-3.9. Thus the weaves that have been treated in different ways and cured at wide range of temperatures with the emulsions of the invention are more repellent against water-based stains and dirt than the untreated weave.

Water Repellency/Proofing on Wood Surfaces

TABLE 17

| | Compositions |
|---|---|
| Comp. Ex. 19 | Silres WH (Wacker Chemie AG) |
| Comp. Ex 20 | Commersial competitor |
| Ex 21 | 7.5 BC 99/046 (1.6% N, 3 w/w %); 6.25 g succinic acid (2.5 w/w %), 3.75 g KH580 (1.5 w/w %), 10 g KH350 (4 w/w %), 1 g butyldiglycol (0.4 w/w %), 1.65 g Lutensol TO5 (0.66 w/w %), 1.1 g Lutensol TO7 (0.44 w/w %), 0.25 g Dispelair CF 56(0.1 w/w %), 218.5 g water (87.4 w/w %). (Total amount = 250 g) |
| Ex 22 | 7.5 BC 99/046 (1.6% N, 3 w/w %); 6.25 g malic acid (2.5 w/w %), 3.75 g KH580 (1.5 w/w %), 10 g KH350 (4 w/w %), 1 g butyldiglycol (0.4 w/w %), 1.65 g Lutensol TO5 (0.66 w/w %), 1.1 g Lutensol TO7 (0.44 w/w %), 0.25 g Dispelair CF 56(0.1 w/w %), 218.5 g water (87.4 w/w %). (Total amount = 250 g) |
| Ex 12 | See table 10 |

Comparative Ex 19 was diluted 1:4 according to the manufacturer's recommendation and Comparative Ex 20 was purchased and used as is. Compositions Ex 21 and Ex 22 were prepared according to preparation method 2. Application of the compositions in table 17 was made according to application method 6.

TABLE 18

| | Contact angles (°) over time (sec) | | |
|---|---|---|---|
| | 1 sec | 15 sec | 60 sec |
| Untreated wood | 0° | 0° | 0° |
| Comp. Ex 19 | 72.5° | 64° | 55.4° |
| Ex 12 | 117.5° | 115.5° | 98.4° |
| Ex 22 | 112.2° | 111.3° | 107.9° |

TABLE 19

| Water uptake | |
|---|---|
| Specimen | Water uptake (%) |
| Untreated wood | 53.8 |
| Comp. Ex 19 | 49.21 |
| Comp. Ex 20 | 46.5 |
| Ex 21 | 33.5 |

As can be seen in table 18, treated wood pieces with the composition of the invention display higher contact angles over time when compared to comparative example and to untreated specimen. In addition, the water uptake is markedly reduced, compared to both untreated and comparative specimen, after treatment with the composition of the invention (table 19).

Water Repellency of Inorganic Surfaces

TABLE 20

| Compositions | |
|---|---|
| Ex. 6 | See table 8 |

Application of composition Ex 6 to glass surface and the subsequent evaluation was performed according to method 7.

TABLE 21

| Static contact angle (°) | |
|---|---|
| Non treated specimen | 50° |
| Ex 6 | 93° |

As can be seen from table 21, the treated glass using the composition of the invention exhibits elevated contact angle in comparison to untreated glass.

Water Repellency/Proofing on Papers

TABLE 22

| Composition | |
|---|---|
| Ex 3 | See table 4 |

Application of the inventive emulsion Ex 3 on paper and the subsequent evaluation was performed using application method 8.

In table 23 it can clearly be seen that the dynamic contact angle of the treated paper is superior to the untreated one and is also maintained over time (120 min).

TABLE 23

| | Dynamic contact angles (°) | | |
|---|---|---|---|
| | 1 min | 30 min | 120 min |
| Untreated | 0° | 0° | 0° |
| Ex 3 | 125° | 125° | 125° |

A sensory panel was used to evaluate the wet marks left behind on the paper after removing droplets of water left on the paper for the number of given minutes (table 25). The panelists were asked to render numerical values for each paper regarding the wet mark attribute (table 25). Wet mark was ranked on a scale from 0, describing a strong wet mark, to 4 describing a not visible wet mark.

TABLE 24

| Assessment legend | |
|---|---|
| 0 | Completely wet |
| 1 | Clearly visible mark |
| 2 | Visible mark |
| 3 | Slightly visible mark |
| 4 | No visible mark |

TABLE 25

| | Wet mark evaluation | | |
|---|---|---|---|
| | 1 min | 30 min | 120 min |
| Untreated | 0 | 0 | 0 |
| Ex 3 | 4 | 4 | 4 |

As can be seen, the treated paper exhibits high dynamic contact angles and leaves no wet marks on the treated paper.

Water Repellency of Paper Board

TABLE 26

| | Compositions | |
|---|---|---|
| Example | Formulation | Dilution |
| Ex. 12 | See table 10 | Not diluted. |
| Ex. 23 | 7.5 g Hansa care 9040(0.4% N, 3 w/w %); 6.25 g acetic acid (2.5 w/w %), 3.75 g KH580 (1.5 w/w %), 10 g KH350 (4 w/w %), 1 g butyldiglycol (0.4 w/w %), 0.25 g Dispelair CF 56 (0.1 w/w %), 3.75 g zirconium acetate hydroxide (1.5 w/w %), 0.375 g Wacker HDK V15 (0.15 w/w %), 217.125 g water (86.85 w/w %). (Total amount = 250 g) | 50% diluted |

Composition Ex 23 (table 26) was prepared according to preparation method 1 and diluted to 50% with water. Application of the emulsions on paper board and their evaluation was performed according to method 5.

TABLE 27

| | Dynamic contact angles (°) | | | | | |
|---|---|---|---|---|---|---|
| | 0 min | 5 min | 15 min | 30 min | 60 min | 120 min |
| Untreated | 0° | 0° | 0° | 0° | 0° | 0° |
| Ex 23 | 124.6° | 124.6° | 123.7° | 125.0° | 124.8° | 123.4° |

The paper board treated with the inventive composition Ex 23 shows a steady and high dynamic contact angle over time, whereas the untreated paper absorbs the water immediately.

TABLE 28

| Cobb$_{60}$ values | |
|---|---|
| | Cobb 60 sec |
| Untreated | Soaked |
| Ex 12 | 6 g water/m2 paper |

From table 28 it can be concluded that the treated paper board using composition Ex 12 of the invention, exhibits greatly reduced water absorptiveness.

Water Repellency/Proofing and Color Change Evaluation

TABLE 29

| Compositions |
|---|
| Ex 3. See table 4 |
| Ex 24  7.5 g STRUKTOL ® VP 5396 (2.5% N, 3 w/w %); 6.25 g acetic acid (2.5 w/w %), 3.75 g KH580 (1.5 w/w %), 10 g KH350 (4 w/w %), 1 g butyldiglycol (0.4 w/w %), 0.25 g Dispelair CF 56 (0.1 w/w %), 3.75 g zirconium acetate hydroxide (1.5 w/w %), 217.5 g water (87 w/w %). (Total amount = 250 g) |

TABLE 30

| | Spray test scores | | | | | |
|---|---|---|---|---|---|---|
| Label | Fabric | Dilution | Application method | Curing T (° C.)/ curing time (min) | Before Rinse | 1 wash |
| Ex 3 | White 100% polyester weave | 1:4 | Method 1 | 170/2 | 5− | 5− |
| Comp. Ex 24 | White 100% polyester weave | 1:4 | Method 1 | 170/2 | 4− | 3+ |

TABLE 31

| Evaluation of the yellowing/color change of treated textiles | | |
|---|---|---|
| | Fabric | Sensory panel evaluation of yellowing |
| Ex 3 | White 100% Polyester microfiber weave | 1 |
| Comp. Ex 24 | White 100% Polyester microfiber weave | 6 |

It is shown in table 30 and 31 that the emulsion according to the invention Ex 3 yields high spray test scores as well as less yellowing/color change.

The invention claimed is:
1. An emulsified liquid composition comprising
a) one or more amino functional organosiloxane of the formula I

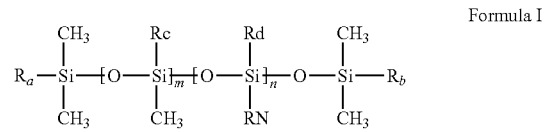

Formula I wherein, Ra, Rb, Rc and Rd, which may be identical or different, denote a hydrogen atom, a phenyl, a benzyl, a C1-C32 alkyl group, a C1-C4 alkoxy group;

m and n are integers dependent on the degree of polymerization and whose sum is between 1 and 2000 and/or weight-average molecular mass of the compound is between 5000 and 500000 and the amino-functional organic group RN is illustrated by groups having the formula —R3NHR4, —R3NR4$_2$, or —R3NHR3NHR4, wherein each R3 is independently a divalent hydrocarbon group having at least 2 carbon atoms, and R4 is hydrogen or an alkyl group, and wherein said one or more amino functional organosiloxane is protonated and has a nitrogen content of 0.05 weight % N—0.4weight % N;

b) one or more hydrolysable alkylsilanes of the formula II

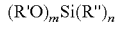   Formula II, wherein

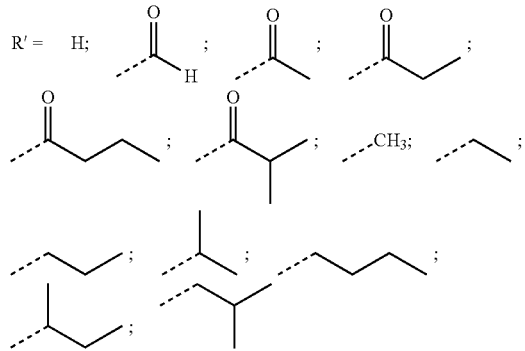

R"=C$_3$-C$_{30}$ alkyl
and the sum of the m+n must be 4, while m≥1;
c) an acid;
d) water;
e) a defoamer;
f) a coalescent agent; and optionally one or more of a preservative, co-emulsifier, catalyst, rheology modifier, fatty acid, oil and/or wax.

2. An emulsified composition according to claim 1, wherein the aminofunctional organosiloxanes in the composition is in the range of 0.01-20 w/w %, compared to the total amount of the composition.

3. An emulsified composition according to claim 2, wherein the aminofunctional organosiloxanes in the composition is in the range of 0.1-10 w/w %.

4. An emulsified composition according to claim 1, wherein the amino functional organosiloxane has a nitrogen content of 0.1 weight % N— 0.4 weight % N.

5. An emulsified composition according to claim 1, wherein the acid is a Brønsted or Lewis acid with a pKa<7; the water is present in amounts of 49-99.9w/w %;
the defoamer is present in an amount of 0.05-10w/w % and the coalescent agent is butyldiglycol.

6. An emulsified composition according to claim 1 additionally comprising a co-surfactant.

7. An emulsified composition according to claim 1 additionally comprising a catalyst.

8. An emulsified composition according to claim 7 in which the catalyst is based on Zirconium.

9. An emulsified composition according to claim 1 additionally comprising at least one of a preservative, a rheology modifier, a fatty acid, a fatty oil and wax.

10. A method of obtaining the emulsified composition according to of claim 1, wherein the ingredients listed in claim 1 are mixed in any order and thereafter optionally mixed and/or homogenized.

11. A method of obtaining the emulsified composition according to claim 1 wherein the method comprises the steps of:
a. Adding the amino functional organosiloxane, the hydrolysable alkylsilane and the defoamer to water,
b. Adding the acid to the coalescent agent and to the resulting mixture in step a),
  i. whereafter the resulting mixtures in steps a-b are optionally mixed and/or optionally homogenized.

12. A method of obtaining the emulsified composition according to claim 1, wherein the method comprises the steps of:
a. Adding the amino functional organosiloxane, the hydrolysable alkylsilane, acid and the defoamer to water,
b. Adding the coalescent agent to the resulting mixture in step a,
  i. wherein the resulting mixtures in steps a-b are optionally mixed and/or optionally homogenized.

13. An application method of enhancing the water repellence of an inorganic, organic or fiber based materials and/or enhancing the treated material's ability to repel water soluble dirt, comprising
a. adding a composition according to claim 1 to said inorganic, organic or fiber based material
b. optionally adjusting the amount of composition applied
c. drying the treated inorganic, organic or fiber based materials until dry and
d. optionally curing the treated inorganic, organic or fiber based materials at a temperature of between 0-250° C.

14. An application method according to claim 13 in which the fiber based material is a nonwoven or woven textile and the composition is added to said material with one of an industrial foulard/padder, by adding it into a washing machine, by spraying it onto said material, or by brushing it or rolling it onto said material.

15. A fiber based material treated according to the application method of claim 13.

16. The application method according to claim 13, wherein the curing step for the treated organic or fiber based materials is performed for consumers at 10-90° C., or for industrial use at 90-250° C.

17. An emulsified composition according to claim 1, wherein the C1-C32 alkyl group is selected from C1-C22 alkyl group.

18. An emulsified composition according to claim 1, wherein the C1-C4 alkoxy group is selected from methoxy or ethoxy.

19. An emulsified composition according to claim 1, wherein each R3 is an alkylene group having from 2 to 20 carbon atoms.

20. An emulsified composition according to claim 1, wherein R3 is selected from the group consisting of:
—CH2CH2-, —CH2CH2CH2-, —CH2CH(CH3)-, CH2CH2CH2CH2-,
  —CH2CH(CH3)CH2-, —CH2CH2CH2CH2CH2-, —CH2CH2CH2CH2CH2CH2-, —CH2CH2CH(CH2CH3)CH2CH2CH2-,
—CH2CH2CH2CH2CH2CH2CH2CH2-, and
—CH2CH2CH2CH2CH2CH2CH2CH2CH2CH2-.

21. An emulsified composition according to claim 1, wherein R4 is methyl.

\* \* \* \* \*